US008081324B2

(12) United States Patent  (10) Patent No.: US 8,081,324 B2
Taneda et al.  (45) Date of Patent: Dec. 20, 2011

(54) INFORMATION PROCESSING APPARATUS, IMAGE FORMING METHOD, AND COMPUTER READABLE STORAGE MEDIUM STORING A PROGRAM FOR REDUCING PRINT PROCESSING TIME

(75) Inventors: Masakazu Taneda, Kawasaki (JP); Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1114 days.

(21) Appl. No.: 11/549,477

(22) Filed: Oct. 13, 2006

(65) Prior Publication Data
US 2007/0091344 A1 Apr. 26, 2007

(30) Foreign Application Priority Data

Oct. 25, 2005 (JP) ................................. 2005-310474
May 22, 2006 (JP) ................................. 2006-141682

(51) Int. Cl.
*G06F 3/12* (2006.01)
(52) U.S. Cl. ........ 358/1.13; 358/1.1; 709/203; 709/206; 709/220
(58) Field of Classification Search .................. 358/1.13, 358/1.1; 709/203, 206, 220; 705/34; 715/735
See application file for complete search history.

(56) References Cited

U.S. PATENT DOCUMENTS

| 6,943,905 B2 * | 9/2005 | Ferlitsch ....................... 358/1.13 |
| 2002/0054333 A1 * | 5/2002 | Yamamoto et al. ........... 358/1.15 |
| 2003/0161670 A1 * | 8/2003 | Watanabe et al. ............... 400/61 |
| 2004/0145766 A1 * | 7/2004 | Sugishita et al. ............ 358/1.13 |
| 2005/0243363 A1 * | 11/2005 | Muto ............................ 358/1.15 |

FOREIGN PATENT DOCUMENTS

| JP | 2004-288013 A | 10/2004 |
| JP | 2004-355492 A | 12/2004 |

OTHER PUBLICATIONS

Komine, Tokiharu, Printing Apparatus, Jun. 20, 2000, JP 2000-168207.*
Tsunehiro Tsukada, Printing Process and Printing System, Dec. 16, 2004, JP 2004355492.*
Hiroshi Koga, Print Control Method, Oct. 14, 2004, JP 2004288013.*

* cited by examiner

*Primary Examiner* — Benny Tieu
*Assistant Examiner* — Martin Mushambo
(74) *Attorney, Agent, or Firm* — Canon USA Inc. IP Division

(57) ABSTRACT

To speedily accomplish print processing, a computer produces print data processible in a printing apparatus based on application data if the application data is created, regardless of user's print instruction. The produced print data is stored in a storage region corresponding to a folder that stores the created application data. If the print instruction is entered by a user, the printing apparatus can promptly execute the print processing using the print data corresponding to the print instruction.

6 Claims, 19 Drawing Sheets

FIG.10

| 1001 | 1002 | 1003 | CORRESPONDING PDL DATA 1004 / 1005 ||
|---|---|---|---|---|
| FILE NAME | UPDATE DATE/TIME | DATA SIZE | FILE NAME | STORAGE ADDRESS |
| AA | ××/××/×× ××:×× | ○○KB | aa | ×××× |
| BB | ○○/○○/○○ ○○:○○ | ××KB | bb | ○○○○ |
| ⋮ | ⋮ | ⋮ | ⋮ | ⋮ |

FIG.12A

SCHEDULED PRINT DESIGNATION ☐ ☒

APPLICATION DATA: AAAAAA
PRINT START (END) TIME: 8:00
START OR END: ◉ START ○ END
DELETE PRINT FORMAT DATA AFTER PRINT PROCESSING: ◉ YES ○ NO

[PRINT SETTING DESIGNATION] ~1205

[OK] [CANCEL]

PRINT SETTING DESIGNATION ☐ ☒

TWO-SIDED: ◉ YES ○ NO
PAGE LAYOUT: 1 PAGE/SHEET
NUMBER OF PRINTS: 5 PRINTS

[OK] [CANCEL]

PRINT START TIME NOTICE ☐ ☒

PRINT OF THE DATA WILL START AT XX:XX AND END AT XX:XX. CHANGE IS ACCEPTABLE UNTIL XX:XX.

PRINT START NOTICE ☐ ☒

PRINT WILL START SOON. SUSPEND?
PRINT WILL AUTOMATICALLY START IN 5 MINUTES IN CASE OF NO RESPONSE.

EXTENSION: ◉ YES ○ NO
EXTENSION TIME: [    ]

[OK]

~1203

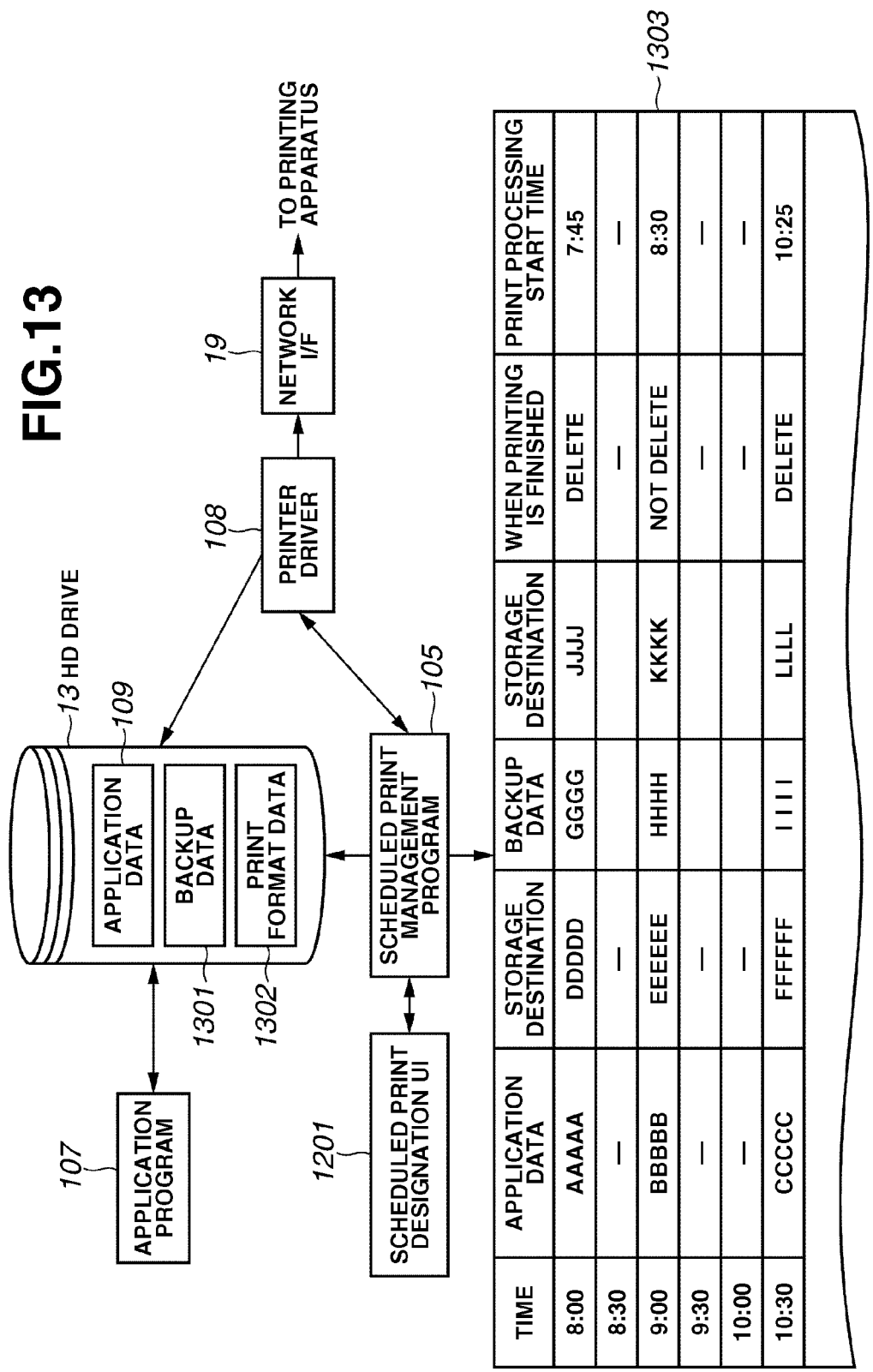

| TIME | APPLICATION DATA | BACKUP DATA | STORAGE DESTINATION | WHEN PRINTING IS FINISHED | PRINT PROCESSING START TIME | SECURITY LEVEL |
|---|---|---|---|---|---|---|
| 8:00 | AAAAA | DDDDD | GGGG | DELETE | 7:45 | MEDIUM |
| 8:30 | — | — | — | — | — | — |
| 9:00 | BBBBB | EEEEE | HHHH | NOT DELETE | 8:30 | LOW |
| 9:00 | BBBBB | EEEEE | HHHH | NOT DELETE | 8:45 | HIGH |
| 9:30 | — | — | IIII | — | — | — |
| 10:00 | — | — | — | — | — | — |
| 10:30 | CCCCC | FFFFFF | IIII | DELETE | 10:25 | HIGH |

1902, 1903

INFORMATION PROCESSING APPARATUS, IMAGE FORMING METHOD, AND COMPUTER READABLE STORAGE MEDIUM STORING A PROGRAM FOR REDUCING PRINT PROCESSING TIME

BACKGROUND OF THE INVENTION

1. Field of the Invention

The present invention relates to an image forming method, an information processing apparatus, an image forming system, a computer program, and a computer readable storage medium. More particularly, the present invention relates to a system including an information processing apparatus configured to request a print, and an image forming apparatus configured to print an image.

2. Description of the Related Art

The following methods are generally usable in the creation of a document by an OS (operating system) or the print processing by print application programs.

(1) A general operating system, such as Windows®, includes an SDK (Software Development Kit) which can provide a common application program interface (API) for fundamental print attribute settings and print instructions.

(2) A user interface (dialog) of an information processing apparatus, as one of ordinary operations of a printer driver, enables a user to designate optional information. When any optional function is designated, the information processing apparatus can create final application data based on the designated optional function and transmit the created application data to a printing apparatus.

(3) When appropriate utility application program is installed in an information processing apparatus, the information processing apparatus can perform bidirectional communications with a printing apparatus to obtain optional information from the printing apparatus. The information processing apparatus can display the optional information obtained from the printing apparatus, and a user can determine desirable print settings with reference to the displayed information.

However, the above-described conventional techniques encounter the following problems in the creation of a document or in the print processing based on application program.

(a) The development kit involved in an operating system, such as SDK of Windows®, is limited in the capability of setting print attributes for a printing apparatus and therefore cannot instruct a sufficient number of functions. Accordingly, even if the printing apparatus has highly advanced functions, available functions are limited to only the fundamental functions of the printing apparatus. None of the value-added functions are available.

(b) The procedure for utilizing optional functions or optional devices of a printing apparatus is complicated. Firstly, an information processing apparatus displays a user interface (dialog) to enable a user to select and designate optional items. Secondly, the information processing apparatus creates final application data based on the designated optional information. Accordingly, the entire procedure for setting the optional items is time-consuming and not easy.

(c) The abilities of application programs, printer drivers and conventional application program interfaces (APIs) prepared and usable for a printing apparatus are insufficient because the settings of various print attributes for realizing optimized print processing cannot be realized.

As a technique capable of solving the above-described problems, as discussed in Japanese Patent Application Laid-open No. 2004-288013, a printing system can include application program(s), a printer driver and a printing device, in which standard print functions of the printing device are commonly usable while the printing device, if it has highly advanced functions, can use its value-added functions.

More specifically, the printer driver obtains device configuration information relating to the printing device, and produces the information relating to print functions of the printing device based on the obtained device configuration information, and notifies the produced print function information via the operating system to the application program.

The application program creates a print document based on the print function information, and instructs the printer driver to perform printing. The printer driver produces a print control command based on the print instruction and sends the produced print control command to the printing device. Thus, application data optimized for the printing device can be produced.

Furthermore, as discussed in Japanese Patent Application Laid-open No. 2004-355492, an image forming apparatus can start print processing at a designated print time. In this case, the image forming apparatus obtains the data to be printed before starting the print processing. Then, when the print time has come, the image forming apparatus communicates with a server to determine whether there is any change in the data to be printed. If the data include any change, the image forming apparatus receives only the changed portion(s) to update the data, and performs the print processing based on the updated data.

Moreover, it may not be sufficient if a user can preferably use the functions of a printing device. The user may further want to speedily get a printed product. According to the conventional technique discussed in Japanese Patent Application Laid-open No. 2004-288013, starting the print processing is not before user's print instruction. It is therefore difficult to reduce the time required for accomplishing the print processing.

Moreover, it is necessary to convert the application data into print format data processible in the printing device. According to the conventional technique discussed in Japanese Patent Application Laid-open No. 2004-355492, the timing for converting the application data into the print format data processible in the printing device is not before the designated print time. It is therefore difficult to substantially reduce the time required for accomplishing the print processing.

SUMMARY OF THE INVENTION

Exemplary embodiments of the present invention are directed to a technique capable of mitigating the above-described problems.

Furthermore, at least one of the exemplary embodiments of the present invention is directed to a technique capable of reducing the time required for accomplishing the print processing.

According to an aspect of the present invention, an image forming method includes: producing print data processible in an image forming apparatus based on application data in a specific region, regardless of a print instruction; and a causing the image forming apparatus to print the print data processible in the image forming apparatus in accordance with the print instruction of the application data in the specific region.

According to another aspect of the present invention, an image forming method includes: receiving a print start time or a print end time of application data designated by a user; producing print data processible in the image forming apparatus at timing earlier than the print start time received, or a print start time determined based on the print end time received, based on the application data having the designated print start time or the print end time; and causing the image forming apparatus to start printing the print data at the print start time received, or at the print start time determined based on the print end time received.

According to yet another aspect of the present invention, an information processing apparatus includes: a production unit configured to produce print data processible in an image forming apparatus based on application data in a specific region, regardless of a print instruction; and a printing unit configured to cause the image forming apparatus to print the print data processible in the image forming apparatus produced by the production unit in accordance with the print instruction of the application data in the specific region.

According to yet another aspect of the present invention, an information processing apparatus includes: a reception unit configured to receive a print start time or a print end time of application data designated by a user; a print data production unit configured to produce print data processible in the image forming apparatus at timing earlier than the print start time received by the reception unit, or a print start time determined based on the print end time received by the reception unit, based on the application data having the designated print start time or the print end time; and a print control unit configured to cause the image forming apparatus to start printing the print data produced by the print data production unit at the print start time received by the reception unit, or at the print start time determined based on the print end time received by the reception unit.

According to yet another aspect of the present invention, an image forming system includes: a production unit configured to produce print data processible in an image forming apparatus based on application data in a specific region, regardless of a print instruction, wherein the image forming apparatus is configured to print the print data processible in the image forming apparatus produced by the production unit in accordance with the print instruction of the application data in the specific region.

According to yet another aspect of the present invention, an image forming system includes: a reception unit configured to receive a print start time or a print end time of application data designated by a user; and a print data production unit configured to produce print data processible in an image forming apparatus at timing earlier than the print start time received by the reception unit, or a print start time determined based on the print end time received by the reception unit, based on the application data having the designated print start time or the print end time, wherein the image forming apparatus starts printing the print data produced by the print data production unit at the print start time received by the reception unit, or at the print start time determined based on the print end time received by the reception unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing the relationship between the application data and related page description language (PDL) data in accordance with the first exemplary embodiment.

FIGS. 12A through 12D are views illustrating examples of graphical user interfaces (GUIs) that enables a user to set a print start time (or print end time) and examples of GUIs that inform the user of the information relevant to the settings in accordance with the second exemplary embodiment.

FIG. 13 is a view illustrating one example of the essential arrangement of a computer that can create a schedule table storing print schedules and backup data in accordance with the second exemplary embodiment.

FIG. 19 is a view showing an exemplary schedule table in accordance with the second exemplary embodiment.

DETAILED DESCRIPTION OF THE EMBODIMENTS

Figure 1:
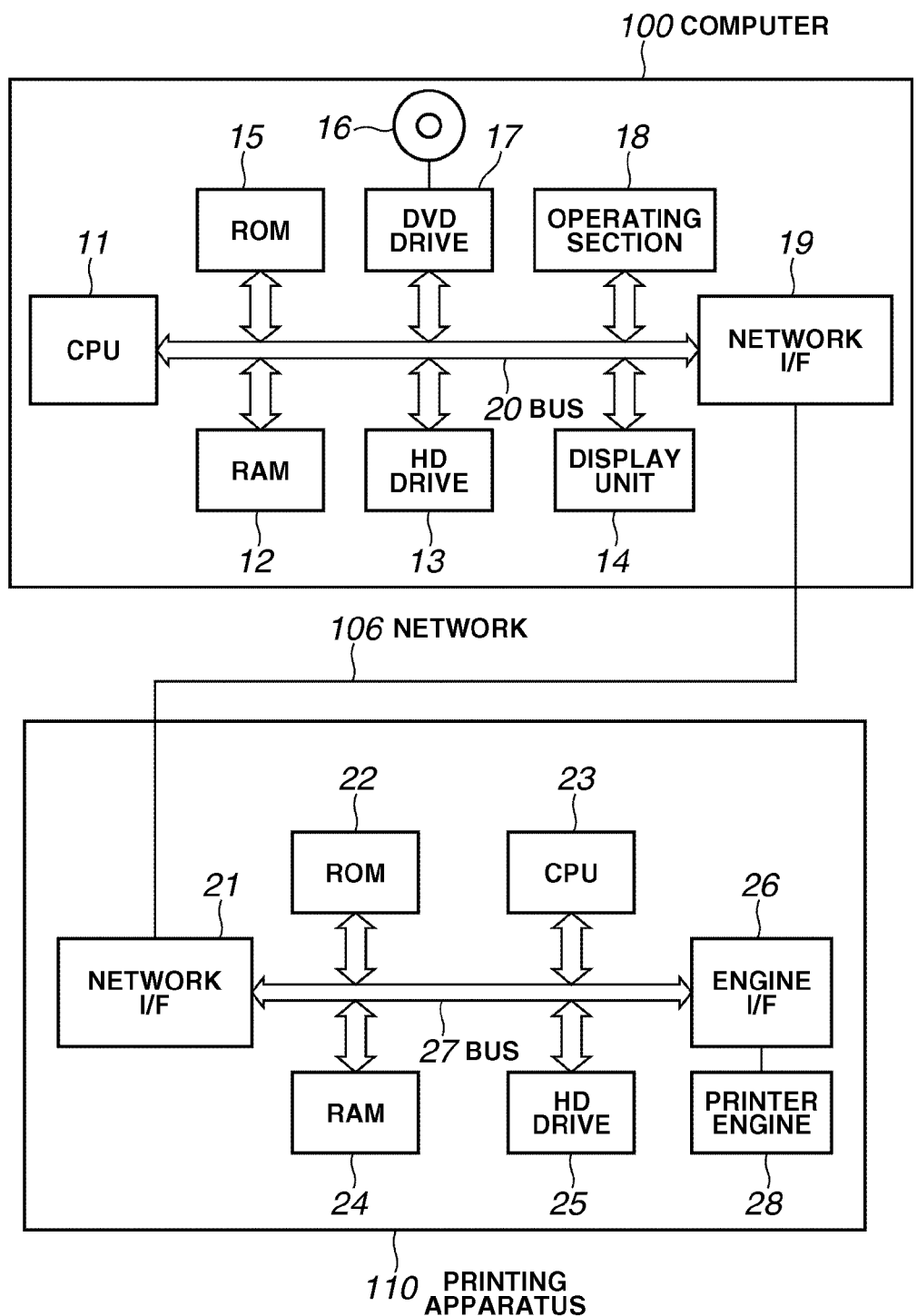
FIG. 1 is a block diagram illustrating an exemplary hardware arrangement of an image forming system in accordance with a first exemplary embodiment.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for signal processing, calculating, displaying and other uses may not be discussed in detail. However, these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described with reference to one figure, it may not be discussed for following figures.

Exemplary embodiments will be described in detail below with reference to the drawings.

First Exemplary Embodiment

FIG. 1 is a block diagram illustrating an exemplary hardware arrangement of an image forming system in accordance with a first exemplary embodiment. The image forming system includes a computer 100 and a printing apparatus 110 (i.e., one example of the image forming apparatus) which are mutually connected via a network 106.

The computer 100 is, for example, an information processing apparatus that can request the printing apparatus 110 to perform print processing based on a user's print instruction. The printing apparatus 110 is an apparatus that can execute the print processing based on the request of the computer 100. The printing apparatus 110 is, for example, an MFP (multi-function peripheral) or other printer. The network 106 is, for example, a local area network (LAN) or Internet that can provide a communication path between the computer 100 and the printing apparatus 110.

The computer (i.e., information processing apparatus) 100 has the following arrangement. A central processing unit (CPU) 11 can execute an OS (operating system) 101 and various programs stored in a read-only memory (ROM) 15 or a hard disk (HD) drive 13. The CPU 11 can control various sections of the computer 100 (refer to FIG. 3).

A random access memory (RAM) 12 can function as a main memory or a work area of the CPU 11 when the CPU 11 executes the OS 101 and various programs. The HD drive 13 can store various application programs including a print control program for controlling the printing apparatus 110, and also store the OS 101 and various data.

Figure 3:
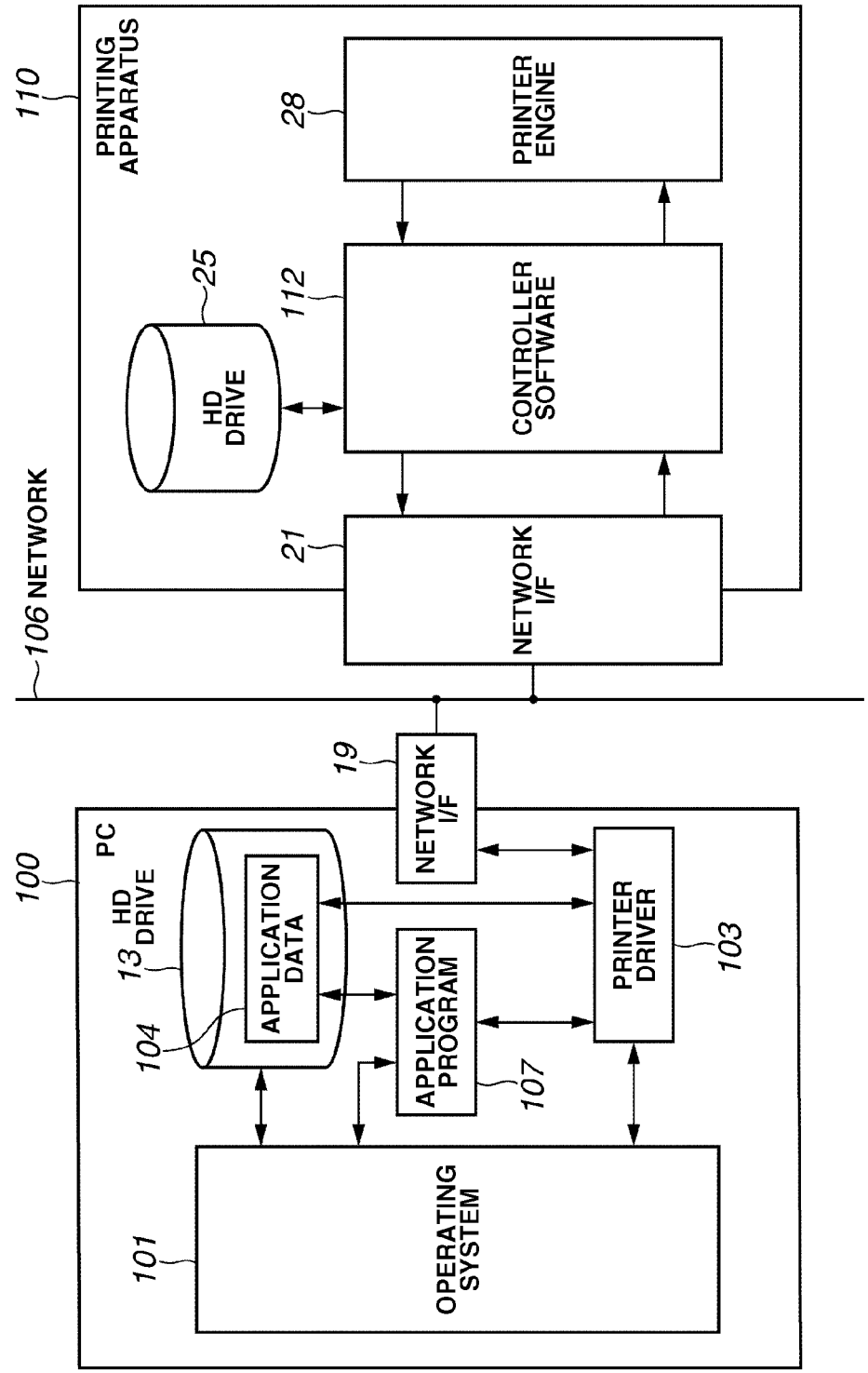
FIG. 3 is a block diagram illustrating an exemplary arrangement of an essential portion of the image forming system in accordance with the first exemplary embodiment.
Figure 4:
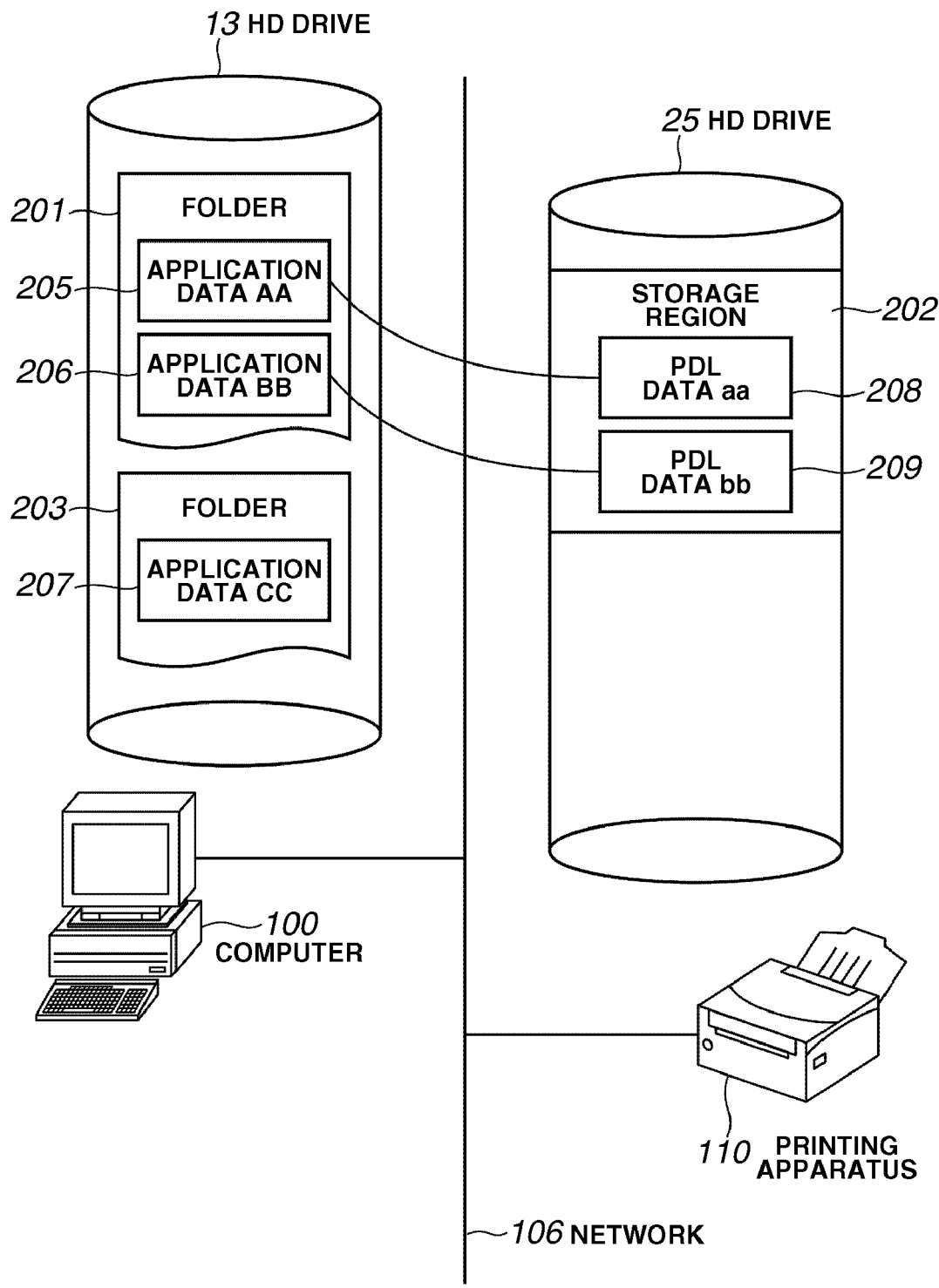
FIG. 4 is a block diagram illustrating an exemplary relationship between a hard disk (HD) drive provided in a computer and a HD drive provided in a printing apparatus in accordance with the first exemplary embodiment.

Furthermore, the HD drive 13 of the present exemplary embodiment includes a folder 201 provided as a specific region (refer to FIG. 4). The folder 201 stores application data 104 (shown in FIG. 3) which can be produced by an application program 107 regardless of user's print instruction (e.g., instruction entered by a user at the timing different from the timing of the print instruction).

Furthermore, in the present exemplary embodiment, the application data 104 can be converted into PDL (Page Description Language) data processible in the printing apparatus 110. However, it is, for example, possible to convert the PDL data into display list format data which the drawing hardware can interpret, or convert the display list format data into image format data printable by a print engine.

A display unit 14 is, for example, a cathode ray tube (CRT) display or a liquid crystal display (LCD) that can display the data or processing results. The ROM 15 can store various programs, font data, and various data (e.g., template data). A digital versatile disk (DVD) 16 can store a printer driver 103, various programs, and various data. A DVD drive 17 can write the printer driver 103, various programs, and the data stored in the DVD 16 into the RAM 12 or the HD drive 13.

An operating section 18 is a user interface which is, for example, equipped with a keyboard and a pointing device. The operating section 18 enables a user to input a print instruction or a creation instruction of the application data 104. A network I/F (interface) 19 is an interface which enables the computer 100 to communicate via the network 106 with an external apparatus (e.g., the printing apparatus 110).

The CPU 11 can execute the processing for expanding (rasterizing) outline fonts in a display information RAM, for example, provided in the RAM 12. Furthermore, the CPU 11 can open various windows registered beforehand and execute various data processing based on a command instructed by a user with a mouse cursor displayed on the display unit 14.

For example, prior to the print processing, a user can open a window relating to print settings. The user can perform settings for a print processing method applied to the printer driver 103, including settings relating to a print format of the printing apparatus 110 and selection of a print mode. Based on the settings determined by the user, a print instruction is sent to the printing apparatus 110. Furthermore, the user can open a window relating to the settings relating to the application data 104 to set the contents of the application data 104.

Furthermore, in the setting window relating to the application data 104, a user can designate the place of the folder 201 which is defined as a specific region in the HD drive 13 where the application data 104 is stored.

Furthermore, a user can perform settings relating to the type of PDL data obtainable from the application data 104 as described later, or settings relating to the printing apparatus 110 which is an output destination of the PDL data.

With the above-described processing, the type of the PDL data obtainable from the application data 104 stored in the folder 201 and the printing apparatus 110 (i.e., the output destination of the PDL data) can be designated for the folder 201 defined as a specific region. The above-described designation can be realized by using a table or by involving the type of the PDL data and the printing apparatus 110 (i.e., output destination of the PDL data) in the application data 104.

The above-described CPU 11, RAM 12, HD drive 13, display unit 14, ROM 15, DVD drive 17, operating section 18, and network I/F 19 are mutually connected via a bus 20.

Next, the printing apparatus 110 will be described. A network I/F (interface) 21 is an interface which enables the printing apparatus 110 to communicate via the network 106 with an external apparatus (e.g., the computer 100). A ROM 22 can store various programs. A CPU 23 can execute the program stored in a ROM 22 or in a HD drive 25 and can control, with a RAM 24 serving as a work area, various sections of the printing apparatus 110. For example, the CPU 23 can output a print command as output information via an engine I/F (interface) 26 to a printer engine 28.

The RAM 24 can function as a main memory or a work area of the CPU 23 when the CPU 23 executes the programs. A HD drive 25 can store print format data processible in the printing apparatus 110, for each application data 104 stored in the folder 201 provided in the above-described HD drive 13.

The above-described network I/F 21, ROM 22, CPU 23, RAM 24, HD drive 25, and engine I/F 26 are mutually connected via a bus 27. The printer engine 28 can perform the processing for carrying a paper or the print processing based on the print command entered from the engine I/F 26.

Figure 2:
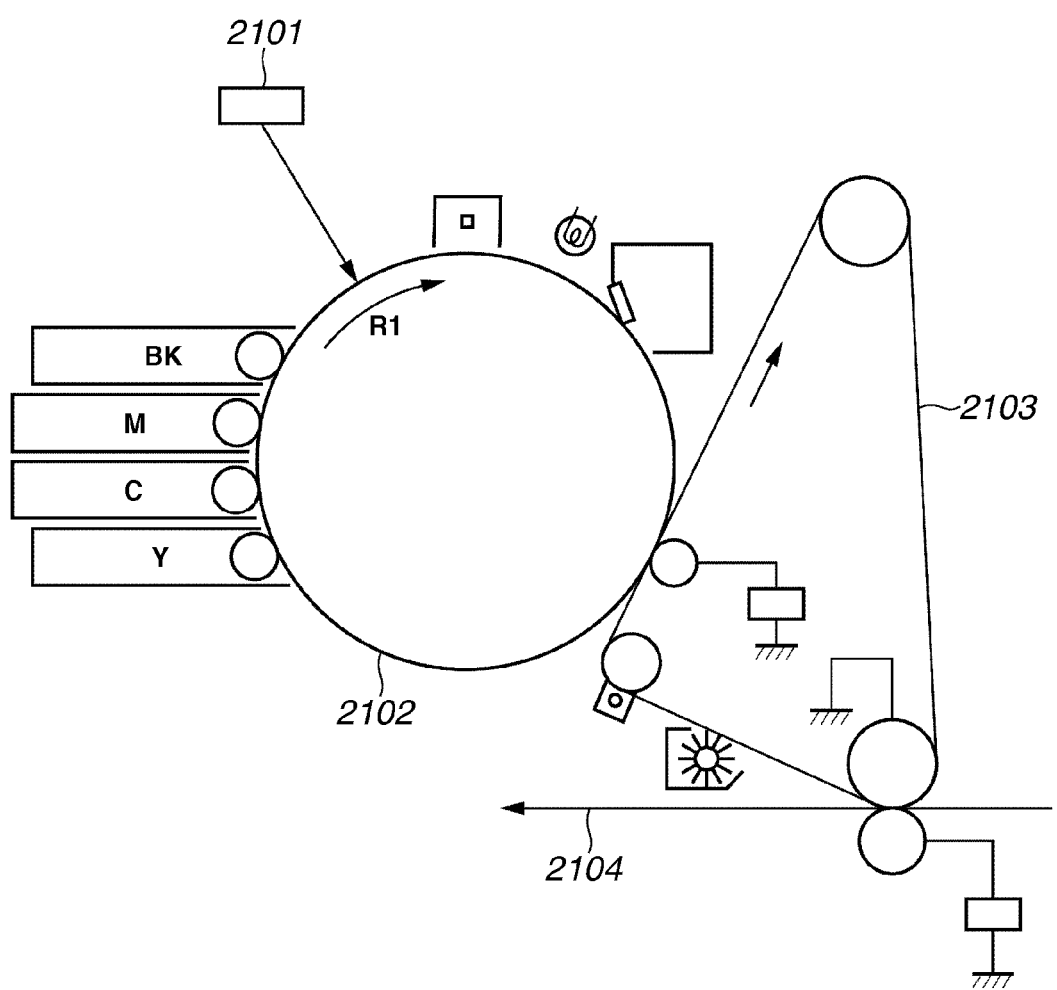
FIG. 2 is a view illustrating an exemplary arrangement of a printer engine provided in a printing apparatus in accordance with the first exemplary embodiment.

FIG. 2 is a view illustrating an exemplary arrangement of the printer engine 28 provided in the printing apparatus 110. The printer engine 28 can form an electrostatic latent image on a photosensitive drum 2102 with a polygon mirror 2101 which can irradiate the photosensitive drum 2102 using a scanning laser beam deflected according to color image data obtainable from an image signal entered via the engine I/F 26.

Then, the printer engine 28 can obtain a visible image by toner developing the electrostatic latent image, and can form a color visible image by multiple transferring all colors of the visible image onto an intermediate transfer member 2103. Furthermore, the printer engine 28 can transfer the color visible image onto a transfer material 2104, and can fix the color visible image on the transfer material 2104.

FIG. 3 is a block diagram illustrating an exemplary arrangement of an essential portion of the image forming system in accordance with the first exemplary embodiment.

An operating system 101 can operate on the computer 100 to perform hardware and software controls for the computer 100. Furthermore, the operating system 101 can perform various processing for enabling the hardware and software components of the computer 100 to communicate with each other.

The printer driver 103 can produce print data preferably usable in the printing apparatus 110 in response to a print request sent from the application program 107 operating on the computer 100 to the printing apparatus 110.

Furthermore, the printer driver 103 can monitor the application data 104 stored in the designated region of the HD drive 13 provided in the computer 100 or the HD drive 25 provided in the printing apparatus 110.

When the application data 104 is updated, the printer driver 103 can convert an object involved in the application data 104 into PDL data processible in the printing apparatus 110. Then, the PDL data can be stored in the HD drive 13 provided in the computer 100 or in the HD drive 25 provided in the printing apparatus 110.

The application data 104, i.e., the data produced by the application program 107, can be transmitted to the printing apparatus 110 via the printer driver 103 and the network I/F 19. As described above, the application program 107 produces the application data 104 and supplies a print request to the printer driver 103. The printing apparatus 110 can perform print processing based on the received print request.

The controller software 112 can control the operation of the printing apparatus 110 and can supply a print command to the printer engine 28. The controller software 112 can be stored in the ROM 22, and can be executed by the CPU 23. The printer engine 28 can perform print processing based on the print command sent from the controller software 112.

FIG. 4 is a block diagram illustrating a relationship between the HD drive 13 provided in the computer 100 and the HD drive 25 provided in the printing apparatus 110.

As described above, the folder 201 is provided in the HD drive 13 of the computer 100 and defined as a specific region. The folder 201 can store the application data 104. Another folder 203 is, for example, a "my document" folder that can store ordinary application data. The application data 104 can be converted, regardless of user's print instruction, into PDL data processible in the printing apparatus 110. The printer driver 103 can designate, for the folder 201, the machine type of the printing apparatus 110 and the PDL type to be output.

The storage region of the application data 104 is not limited to the specific region shown in FIG. 4. For example, it is possible to mount a storage region 202 of the HD drive 25 provided in the printing apparatus 110 on a recording medium of the computer 100, so that the application data 104 can be stored in the mounted storage region which serves as a specific region.

The storage region 202, which is defined in the HD drive 25 of the printing apparatus 110, can store PDL data processible in the printing apparatus 110 for each application data 104 stored in the folder 201. For example, when the computer 100 stores application data (refer to 205 and 206) in the specific region of the folder 201, the printing apparatus 110 creates and stores corresponding PDL data (refer to 208 and 209). However, when the computer 100 stores application data (refer to 207) in a region other than the specific region, the printing apparatus 110 does not create and store corresponding PDL data.

Figure 5:
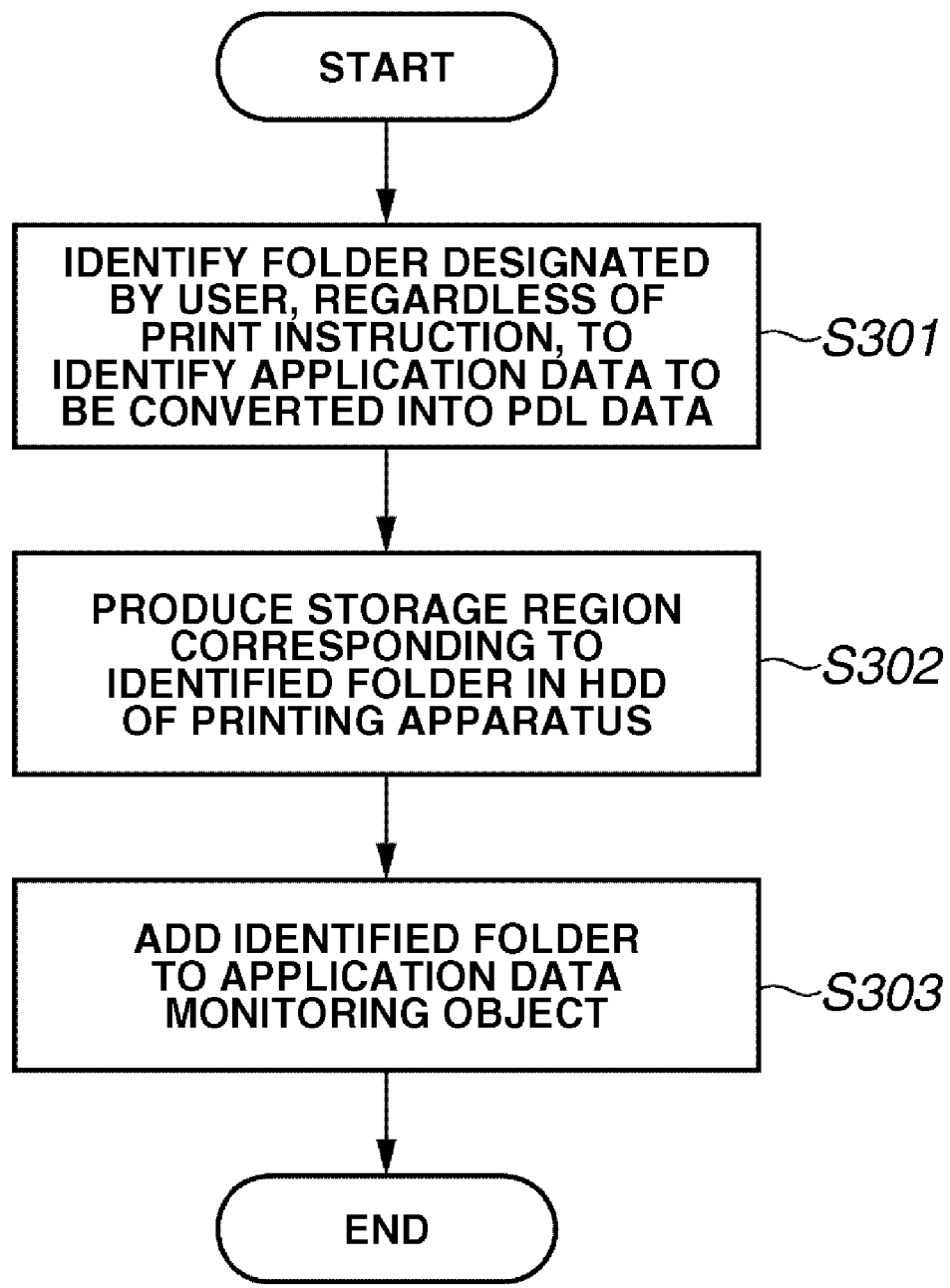
FIG. 5 is a flowchart showing an exemplary operation of the image forming system performed, when a storage region corresponding to a folder is formed in the HD drive of the printing apparatus, in accordance with the first exemplary embodiment.

FIG. 5 is a flowchart showing an exemplary operation of the image forming system performed when the storage region 202 corresponding to the folder 201 is formed in the HD drive 25 of the printing apparatus 110.

In FIG. 5, the printer driver 103 identifies a folder designated by a user, regardless of user's print instruction, to identify the application data to be converted into PDL data processible in the printing apparatus 110 (refer to step S301). In response to the identification, the printer driver 103 causes the HD drive 25 to produce the storage region 202 corresponding to the place of the identified folder 201 (refer to step S302)

For example, the printer driver 103 transmits the information relating to the place of input folder 201 via the network I/F 19 to the printing apparatus 110. When the controller software 112 of the printing apparatus 110 inputs the information relating to the place of folder 201, the controller software 112 of the printing apparatus 110 produces the storage region 202 corresponding to the input place in the HD drive 25. Then, the printer driver 103 adds the folder 201 into a list and designates the application data 104 stored in the folder as application data of an object to be monitored (refer to step S303).

The folder 201 registered in the list is the object to be monitored. For example, the printer driver 103 determines whether the application data 104 is newly created in the folder 201 registered in the list. The printer driver 103 can determine whether the application data 104 is newly added or updated based on later-described information shown in FIG. 10.

Figure 6:
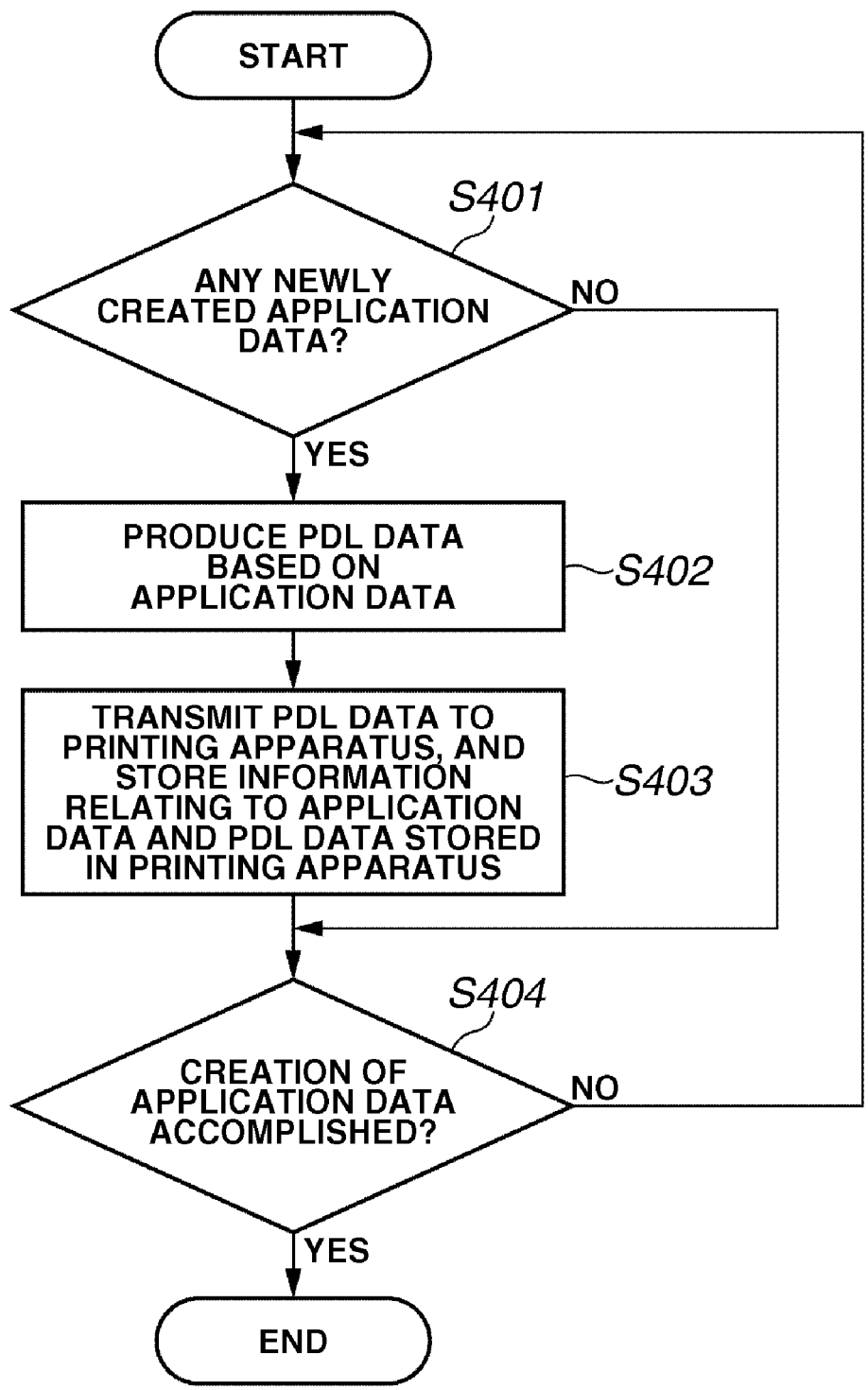
FIG. 6 is a flowchart showing an exemplary operation of the image forming system performed, in response to creation of new application data, in accordance with the first exemplary embodiment.

FIG. 6 is a flowchart showing an exemplary operation of the image forming system performed when the application data 104 is newly created.

In FIG. 6, the printer driver 103 determines whether the application program 107 has newly created the application data 104 in the folder 201 defined as a specific region (refer to step S401). When the application data 104 is not newly created (i.e., NO in step S401), processing proceeds to step S404 (described later). When the application data 104 is newly created (i.e., YES in step S401), the printer driver 103 produces one kind or plural kinds of PDL data corresponding to the print layout often used and corresponding to the printing apparatus 110 (refer to step S402).

More specifically, the processing of step S402 is executed when the application data is newly created, regardless of the print instruction. In the exemplary embodiment, the printer driver 103 produces plural kinds of PDL data.

In the present exemplary embodiment, the printer driver 103 identifies the print format of the printing apparatus 110 based on the information relating to the printing apparatus 110 designated in the specific region 201 as described above.

Furthermore, in the present exemplary embodiment, the HD drive 13 can store the frequency of use for each print layout used by the printer driver 103. When the frequency of use is equal to or greater than a predetermined frequency of use, the print layout has a higher frequency in use. For example, if a user frequently performs the 2UP print (i.e., printing 2 pages on a sheet), the printer driver 103 creates PDL data for 2UP print.

Next, the printer driver 103 produces PDL data based on the produced objects. Then, the printer driver 103 stores the produced PDL data into the storage region 202 corresponding to the place of the folder 201 in which the newly created application data 104 is stored (refer to step S403).

For example, the printer driver 103 produces PDL data based on the produced plural kinds of objects. Then, the printer driver 103 adds a registration command (i.e., a command designating the registration place) to the PDL data and transmits the registration command to the printing apparatus. Then, the HD drive 13 stores correlation information (i.e., information correlating the information identifying the application data with the information identifying the PDL data).

The controller of the printing apparatus causes the HD drive 25 to store the PDL data into the storage region 202 corresponding to the place of the folder 201 which stores the application data 104, based on the received registration command.

Alternatively, the printer driver 103 can add the PDL data to the application data 104, for example, by using a commentary sentence, and can transmit the application data 104 including the added PDL data via the network I/F 19 to the printing apparatus 110.

Then, the controller software 112 of the printing apparatus 110 causes the HD drive 25 to store the PDL data involved in the input application data 104, as print format data corresponding to the application data 104, into a print format file of the storage region 202.

In the present exemplary embodiment, the printer driver 103 can identify the type of produced PDL data based on the type of PDL data designated for the folder 201 (i.e., a specific region) as described above. Furthermore, as shown in FIG. 10, the HD drive 13 can store file name 1001, update date/time 1002, data size 1003, PDL data corresponding to file name 1004, and storage address 1005.

Next, the printer driver 103 determines whether the application program 107 has accomplished the processing for creating the application data 104 (refer to step S404). When the application program 107 has not yet accomplished the processing for creating the application data 104 (i.e., NO in step S404), the printer driver 103 repeats the processing of steps S401 through S404. When the application program 107 has yet accomplished the processing for creating the application data 104 (i.e., YES in step S404), the processing shown in FIG. 6 ends.

Figure 7:
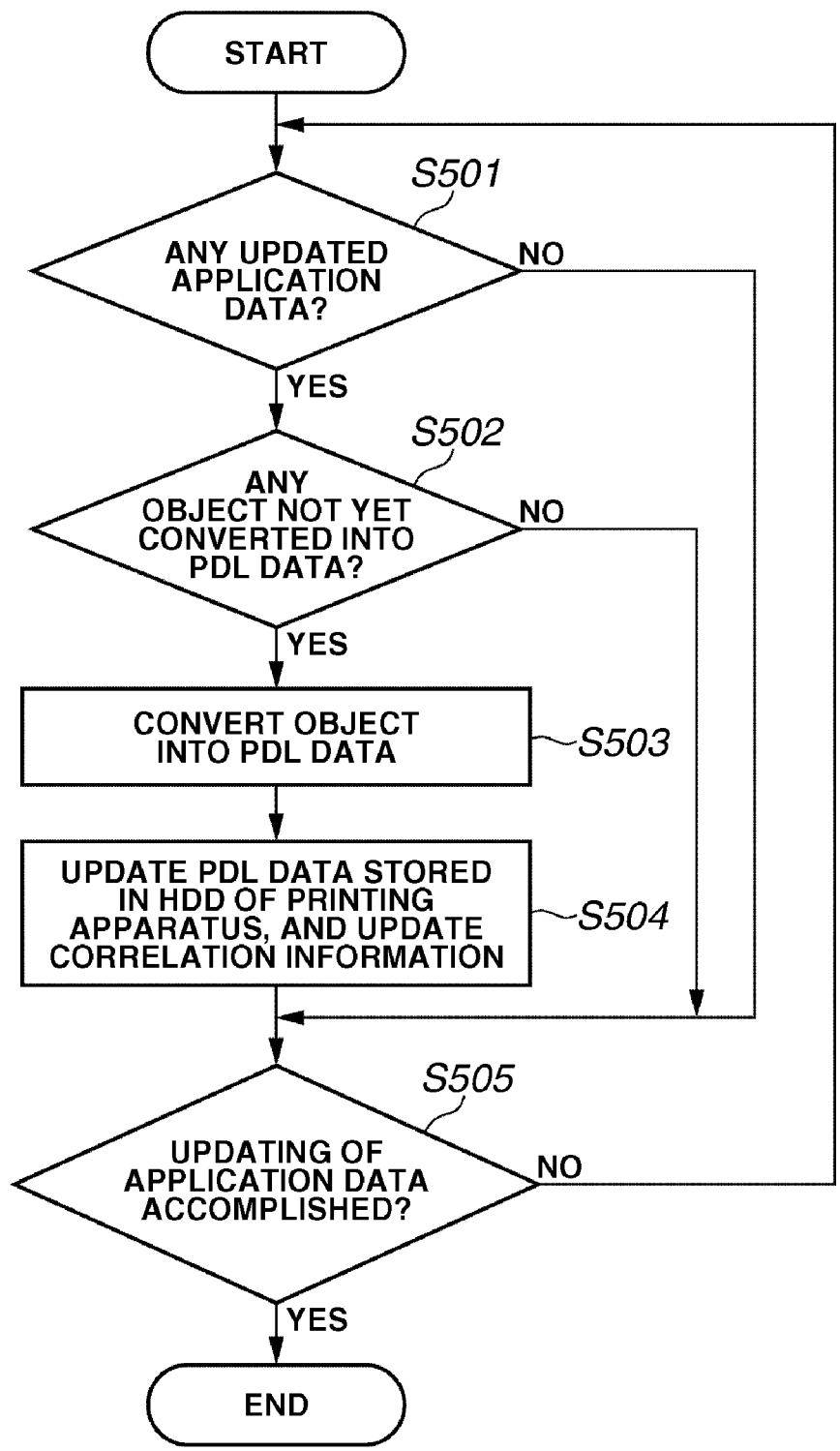
FIG. 7 is a flowchart showing an exemplary operation of the image forming system performed, in response to update of the application data, in accordance with the first exemplary embodiment.

FIG. 7 is a flowchart showing an exemplary operation of the image forming system performed in response to update of the application data 104.

The processing of FIG. 7 is executed at predetermined intervals. In FIG. 7, first, the printer driver 103 determines whether the application program 107 has updated the application data 104 (refer to step S501). For example, the printer driver 103 compares the information of each file (refer to 205 and 206) in the folder 201 defined as a specific region with the information of FIG. 10.

When the update date/time and the data size are changed, the printer driver 103 determines that the application data 104 has been updated. When it is determined that the application data 104 has not been updated (i.e., NO in step S501), processing proceeds to step S505 (described later). When it is determined that the application data 104 has been updated (i.e., YES in step S501), the printer driver 103 determines whether the updated application data 104 include any object not yet converted into PDL data processible in the printing apparatus 110 (refer to step S502).

When there is not any object not yet converted into the PDL data (i.e., NO in step S502), processing proceeds to step S505 (described later). When there is any object not yet converted into the PDL data (i.e., YES in step S502), the printer driver 103 converts the object into PDL data corresponding to the print layout often used and processible in the printing apparatus 110 (refer to step S503).

Next, the printer driver 103 causes the HD drive 25 to produce the PDL data converted in step S503 in the print format file (storage region 202) corresponding to the place of the folder 201 which stores the updated application data 104.

Then, the printer driver 103 updates the PDL data file (e.g., 208 and 209) (refer to step S504). Furthermore, the printer driver 103 updates the update date/time and data size of the updated application data (refer to FIG. 10).

For example, the printer driver 103 produces PDL data based on the updated application data. Then, the printer driver 103 designates PDL data file name and address in the HD of a printing apparatus which updates the PDL data in accordance with the application data. And, the printer driver 103 adds an update command to the produced PDL data.

Then, the printer driver 103 transmits the PDL data including the update command via the network I/F 19 to the printing apparatus 110. The update command includes the file name and address of the PDL data file to be updated. Then, based on the PDL data including the update command, the controller software 112 of the printing apparatus 110 updates PDL data having the designated file name or address.

Next, the printer driver 103 determines whether the application program 107 has accomplished the processing for updating the application data 104 (refer to step S505). When it is determined that the application program 107 has not yet accomplished the processing for updating the application data 104 (i.e., NO in step S505), the printer driver 103 repeats the processing of steps S501 through S505. Although the exemplary processing of FIG. 7 is for updating part of the PDL data, the application can re-create all of the PDL data and replace the PDL data with re-created PDL data. When it is determined that the application program 107 has accomplished the processing for updating the application data 104 (i.e., YES in step S505), the processing shown in FIG. 7 ends.

Figure 8:
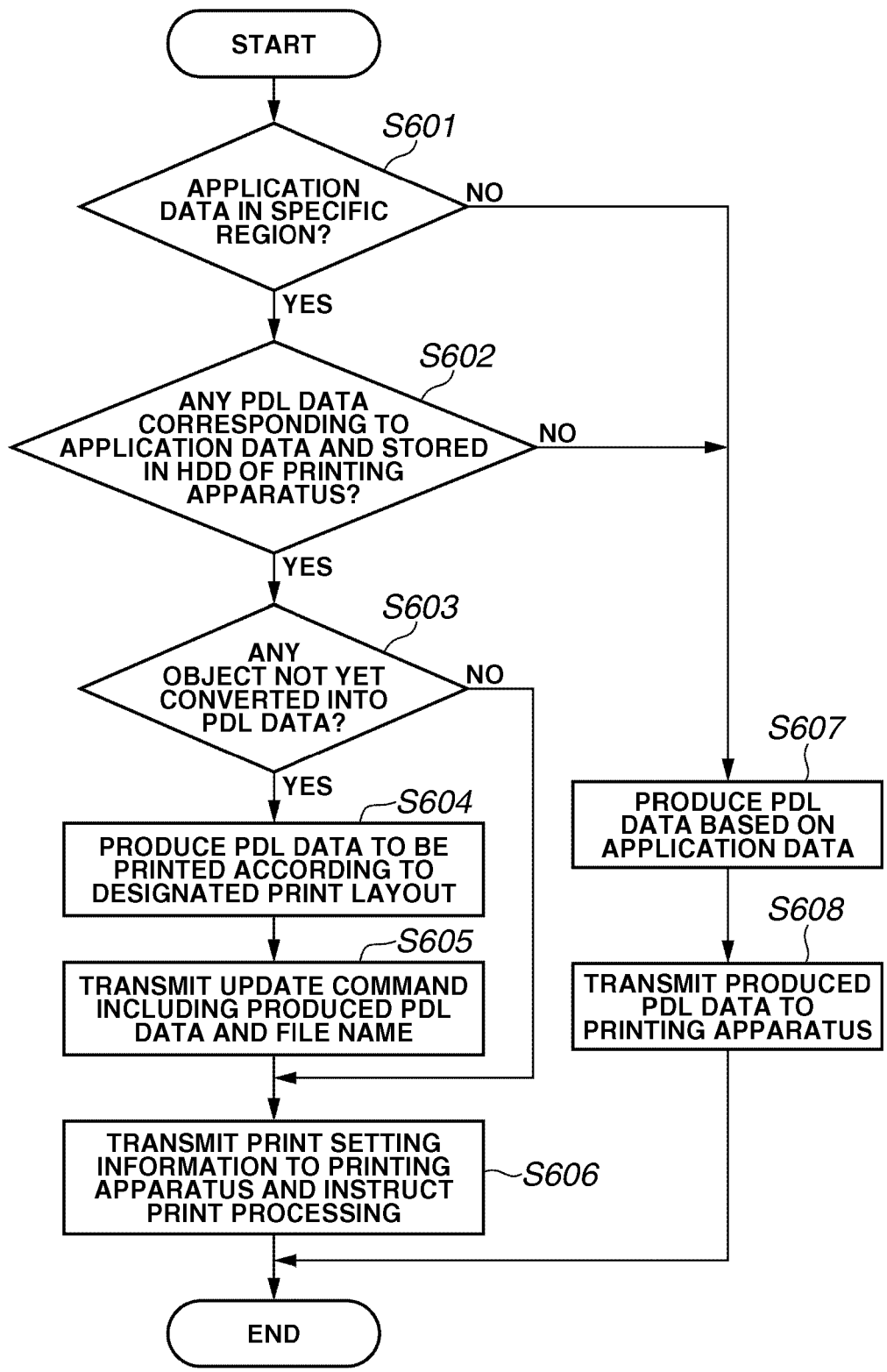
FIG. 8 is a flowchart showing an exemplary operation of the image forming system performed, when a print instruction is sent to a printing apparatus, in accordance with the first exemplary embodiment.

FIG. 8 is a flowchart showing an exemplary operation of the image forming system performed when a print instruction is sent to the printing apparatus 110. The printer driver 103 executes the processing of FIG. 8, based on user's operation on the operating section 18, when the application program 107 instructs execution of print.

The printer driver 103 determines whether application data corresponding to the print execution instruction is the application data 104 stored in the folder 201 (i.e., specific region) defined in the HD drive 13 (refer to step S601). When the application data corresponding to the print execution instruction is not the application data 104 stored in the folder 201 (i.e., NO in step S601), the printer driver 103 performs the ordinary print processing. More specifically, the printer driver 103 produces PDL data based on the application data (refer to step S607). Then, the printer driver 103 transmits the produced PDL data to the printing apparatus (refer to step S608).

Then processing of FIG. 8 ends.

When the application data corresponding to the print execution instruction is the application data 104 stored in the folder 201 (i.e., YES in step S601), the processing flow proceeds to step S602. Then, the printer driver 103 determines whether a PDL data file corresponding to the application data 104 is present in the storage region 202 of the printing apparatus 110 (refer to step S602). When there is no PDL data file corresponding to the application data 104 (i.e., NO instep S602), the printer driver 103 performs the above-described ordinary print processing (refer to steps S607 and S608).

On the other hand, when a PDL data file corresponding to the application data 104 is present in the storage region 202 of the HD drive 25 of the printing apparatus 110 (i.e., YES in step S602), the processing flow proceeds to step S603. Then, the printer driver 103 determines whether there is any object not yet converted into the PDL data (refer to step S603).

When an object not yet converted into PDL data processible in the printing apparatus 110 is present, (i.e., YES in step S603) the printer driver 103 produces PDL data processible in the printing apparatus 110 based on the application data according to a designated print layout (refer to step S604). Next, the printer driver 103 transmits, to the printing apparatus, an update command including the produced PDL data and the file name and address of the PDL data to be updated, so that the printing apparatus can update the PDL data corresponding to the updated application data (refer to step S605). The printing apparatus updates the PDL data stored in the storage region 202 designated by the file name or address involved in the update command, based on the PDL data involved in the update command.

Next, the printer driver 103 transmits print setting information via the network I/F 19 to the printing apparatus 110, and instructs the printing apparatus 110 to execute print processing (refer to step S606). The print setting information includes the information (file name, storage address, etc.) identifying a PDL data file stored in the printing apparatus corresponding to the print instructed application data, and a command instructing the printing apparatus 110 to print the PDL data file.

When there is no object not yet converted into the PDL data (i.e., NO in step S603), the printer driver 103 skips steps S604 and S605 and executes the processing of step S606.

Figure 9:
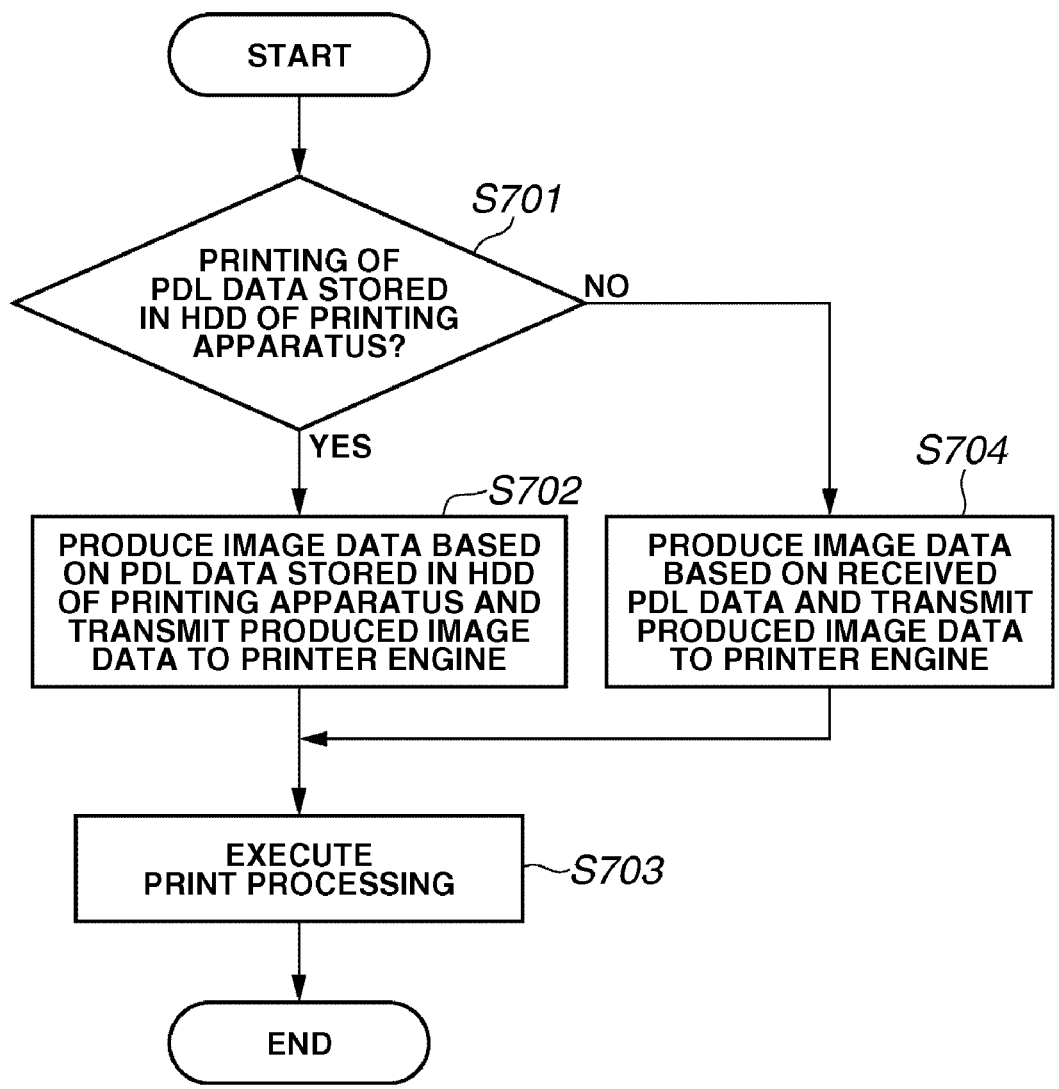
FIG. 9 is a flowchart showing an exemplary operation of the image forming system performed, when the printing apparatus executes print processing, in accordance with the first exemplary embodiment.

FIG. 9 is a flowchart showing an exemplary operation of the image forming system performed when the printing apparatus 110 executes the print processing. In FIG. 9, the controller software 112 of the printing apparatus 110 determines whether the contents of the print instruction received from the computer 100 include print instruction of the PDL data file stored in the storage region 202 of the HD drive 25 (refer to step S701).

When the contents of the print instruction do not include a print instruction of the PDL data file stored in the storage region 202 of the HD drive 25 (i.e., NO in step S701), the controller software 112 of the printing apparatus 110 performs ordinary print processing (refer to step S704).

The ordinary print processing includes operations for producing image data based on received PDL data, transmitting the produced image data to the print engine, and causing the print engine to execute the print processing. Then, the printer engine 28 executes the print processing according to the image data produced in step S704 (refer to step S703).

On the other hand, when the contents of the print instruction include the print instruction of the PDL data file stored in the storage region 202 of the HD drive 25 (i.e., YES in step S701), the controller software 112 produces image data based on the PDL data file stored in the storage region 202 of the HD drive 25 and transmits produced image data to the printer engine 28, and instructs the printer engine 28 to execute the print processing (refer to step S702). Then, the printer engine 28 executes the print processing according to the print command sent from the controller software 112 (refer to step S703).

As described above, according to the present exemplary embodiment, when the application data 104 is created (or updated) and stored in the folder 201, the data corresponding to the print layout often used and processible in the printing apparatus 110 can be produced based on the application data 104. Then, the produced data (e.g., the PDL data) can be stored in the storage region 202 corresponding to the folder 201 that stores the created application data 104.

As described above, the present exemplary embodiment can produce several kinds of objects corresponding to the print layout often used and also processible in the printing apparatus 110 beforehand, regardless of user's print instruction, and can produce PDL data based on the produced objects and store the produced PDL data.

Thus, when a user's print instruction is entered, the PDL data already produced can be used for the printing of an object corresponding to the input print instruction. If no PDL data is available, PDL data can be produced for the object corresponding to the input print instruction.

As described above, regardless of user's print instruction (i.e., prior to issuance of print instruction), the print processing can be partly performed. Therefore, the time required for accomplishing the print processing after starting the print processing in response to user's print instruction can be reduced.

According to the present exemplary embodiment, the PDL data processible in the printing apparatus 110 is stored in the HD drive 25 of the printing apparatus 110. However, it is possible to store the PDL data processible in the printing apparatus 110 in the HD drive 13 of the computer 100, or in a storage region (storage device) connected via the network 106.

Furthermore, according to the present exemplary embodiment, the PDL data is added to the application data 104. However, it is not always necessary to add the PDL data to the application data 104. For example, when the application data 104 is updated, a new file corresponding to the original print format file can be produced, and the PDL data can be included in the produced file. Then, the computer 100 can transmit the file including the PDL data to the printing apparatus 110.

Furthermore, according to the present exemplary embodiment, the computer 100 produces PDL data and transmits the produced PDL data to the printing apparatus 110. However, the computer 100 can request the printing apparatus 110 to produce the PDL data.

In this case, the computer 100 transmits, to the printing apparatus 110, an object having a print format corresponding to the printing apparatus 110. The printing apparatus 110 stores the received object. Subsequently, when the computer 100 requests production of the PDL data, the printing apparatus 110 produces PDL data based on the stored object.

Thus, because the object having the print format corresponding to the printing apparatus 110 is already produced, the print processing can be quickly started in response to user's print instruction.

Second Exemplary Embodiment

Next, a second exemplary embodiment of the present invention will be described. The above-described first exemplary embodiment is characterized in that the application data 104 stored in the folder 201 can be converted, regardless of a user's print instruction, into the data having the print format corresponding to the printing apparatus 110.

On the other hand, the second exemplary embodiment can convert application data having a designated print start time and print end time into data having a print format corresponding to the printing apparatus 110. The second exemplary embodiment is partly different from the first exemplary embodiment in the software processing. In the following description of the second exemplary embodiment, portions identical to those of the first exemplary embodiment are denoted by the same reference numerals shown in FIGS. 1 through 10.

Figure 11:
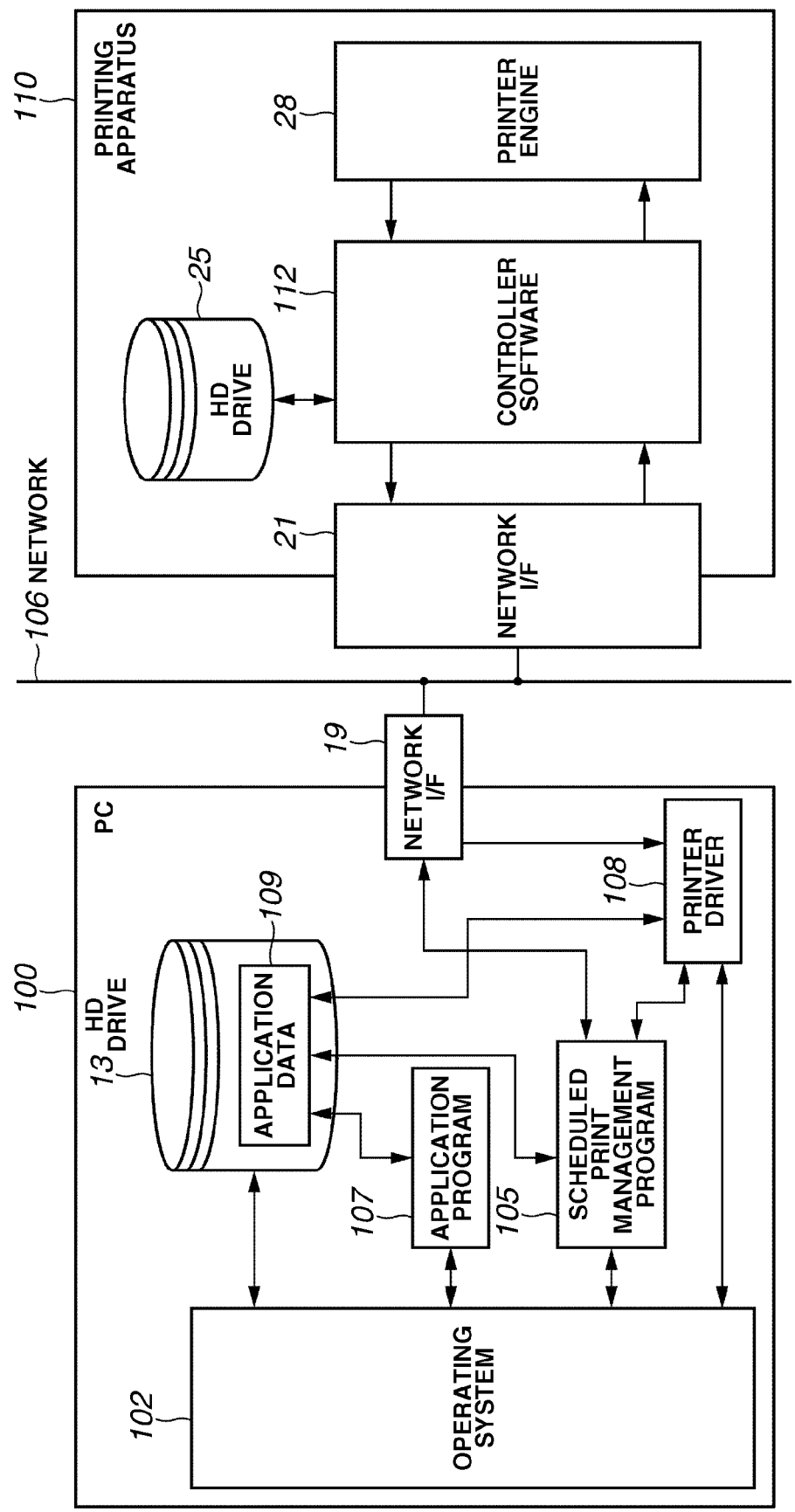
FIG. 11 is a block diagram showing an exemplary arrangement of an essential portion of the image forming system in accordance with a second exemplary embodiment.

FIG. 11 is a block diagram showing an exemplary arrangement of an essential portion of the image forming system in accordance with the second exemplary embodiment.

The operating system 102 can operate on the computer 100 to perform hardware and software controls of the computer 100. Furthermore, the operating system 102 can perform various processing for enabling the hardware and software components of the computer 100 to communicate with each other. Furthermore, the operating system 102 has a time management function and can obtain the present time from the software operating on the operating system 102.

The HD drive 13, provided in the computer 100, can store the software operating on the computer 100 and the data used in the software. A scheduled print management program 105 operating on the computer 100 can instruct the printing apparatus 110 (i.e., one example of the image forming apparatus) to perform print processing. A printer driver 108 can produce print data preferably usable in the image forming apparatus 110.

The scheduled print management program 105 enables a user to designate desirable print start time (or print end time) of application data 109. The operating system 102 can instruct the application data 109 having the designated print start time (or print end time) to the printer driver 108.

The printer driver 108 can convert the application data 109 instructed from the operating system 102 into the data (e.g., PDL data) having a print format corresponding to the printing apparatus 110. The data having the print format corresponding to the printing apparatus 110 can be stored in the HD drive 13 of the computer 100 or in the HD drive 25 of the printing apparatus 110.

The storage destination of the data having the print format corresponding to the printing apparatus 110 (i.e., the HD drive 13 of the computer 100 or the HD drive 25 of the printing apparatus 110) can be determined based on user's instruction. In the context of the following description, the data having the print format corresponding to the printing apparatus 110 can be referred to as "print format data."

In the present exemplary embodiment, the application data 109 has a general format such as XML. If the application data 109 have a format analyzable by specific application, the operating system 102 activates the application program 107 in response to an instruction of the scheduled print management program 105 or the printer driver 108. Then, the application program 107 analyzes the application data 109.

Furthermore, the print processing of the print format data stored in the HD drive 13 of the computer 100 or in the HD drive 25 of the printing apparatus 110 can be started at the time designated by a user according to one of the following two methods.

According to one method, the scheduled print management program 105 can instruct the printing apparatus 110 to start the print processing at the print start time designated by a user (or the print start time determined based on the print end time designated by a user or a job).

According to another method, the scheduled print management program 105 can notify the printing apparatus 110 of the print start time designated by a user (or the print start time determined based on the print end time designated by a user or a job) beforehand, so that the printing apparatus 110 can start the print processing based on its own decision.

Furthermore, the scheduled print management program 105 can monitor the application data 109 stored in the HD drive 13 of the computer 100, when the print start time (or print end time) of the application data 109 is designated by a user. The printer driver 108, when the application data 109 is updated, can convert the updated application data 109 into print format data.

Then, the printer driver 108 can cause the HD drive 13 of the computer 100 or the HD drive 25 of the printing apparatus 110 to store the converted print format data. The processing of monitoring the application data 109 and updating the print format data starts when the print data is produced (or when the print data is stored) and continues until the print processing is actually started.

The application data 109 can be produced by the application program 107. The print format data converted from the application data 109 can be transmitted via the printer driver 108 and the network I/F 19 to the printing apparatus 110. The network I/F 19 can control communications between the computer 100 and the network 106. The network 106 can connect the computer 100 to the printing apparatus 110. The application program 107 can produce the application data 109.

The network I/F 21 of the printing apparatus 110 can control communications between the printing apparatus 110 and the network 106. The controller software 112 can control operations of the printing apparatus 110, and can supply a print command to the printer engine 28. The printer engine 28 can perform the print processing according to the print command supplied from the controller software 112. The HD drive 25 is an external storage unit incorporated in the printing apparatus 110.

FIGS. 12A through 12D show examples of a GUI that enables a user to set a desirable print start time (or print end time) and examples of a GUI that informs the user of information relevant to the settings.

A scheduled print designation user interface 1201 shown in FIG. 12A is a graphic user interface displayed on the display unit 14 of the computer 100 to enable a user to set a desirable print start time (or print end time).

Using the scheduled print designation user interface 1201, a user can designate target application data and the print start time (or print end time) and/or can determine whether the print format data will be deleted after accomplishing the print processing.

When a user presses a print setting designation button 1205, a print setting designation user interface 1204 is displayed on the display unit 14 of the computer 100 as shown in FIG. 12B. Using the print setting designation user interface 1204, a user can designate two-sided print, page layout, and number of copies.

Upon accomplishing user's print settings on the print setting designation user interface 1204, the print settings can be fixed. Therefore, the application data 109 can be converted into print format data according to the print settings.

In general, if the page layout of print format data is changed during the print processing, the printing apparatus 110 cannot perform the print processing at the maximum speed. However, the present exemplary embodiment can solve such a problem, because the application data 109 can be converted beforehand into the print format data complying with the print settings.

When a user designates a print start time (or print end time) of the application data 109 using the scheduled print designation user interface 1201, the scheduled print management program 105 sends the following instructions to the printer driver 108.

First, the scheduled print management program 105 instructs the printer driver 108 to convert the application data 109 into print format data. In addition to this instruction, the scheduled print management program 105 instructs the printer driver 108 to store the print format data into the HD drive 13 of the computer 100 or in the HD drive 25 of the printing apparatus 110.

The printer driver 108 performs the following calculations to convert the application data 109 into the print format data. First, the printer driver 108 calculates the time required to convert the application data 109 into the print format data. Furthermore, the printer driver 108 calculates the print processing time (i.e., the time required when the printing apparatus 110 prints the print format data) based on complexity of the print format data, processing abilities of the printing apparatus 110, and print settings (especially, the number of copies).

For example, the printer driver 108 can calculate the print processing time in the following manner. First, the printer driver 108 can obtain the complexity of the print format data based on the object type (e.g., character, graphic, or image) involved in print format data 1302, size of each object, and drawing processing method. Furthermore, the printer driver 108 can obtain the processing abilities of the printing apparatus 110 based on the performance of CPU 23 (clock, cache size, etc) and the presence of a dedicated accelerator (e.g., expansion H/W of compression data).

Next, based on the complexity of the print format data 1302 and the processing abilities of the printing apparatus 110, the printer driver 108 determines whether the printing apparatus 110 can print the print format data at the maximum print speed of the printing apparatus 110.

When the printing apparatus 110 cannot print the print format data at the maximum print speed of the printing apparatus 110, the printer driver 108 obtains an average print processing time required to print one page of the print format data based on the contents of the print format data and processing abilities of the printing apparatus 110.

The maximum print speed of the printing apparatus 110 is a maximum value of pages printable by the printing apparatus 110 within the unit time. Furthermore, the printer driver 108 obtains a total print page number of the print format data, based on the contents of the print format data and the print settings (especially, the number of copies).

When the print format data can be printed at the maximum print speed of the printing apparatus 110, the printer driver 108 calculates the print processing time based on the maximum print speed, the complexity of the print format data, the processing abilities of the printing apparatus 110, the print settings, and the total print page number.

On the other hand, when the print format data cannot be printed at the maximum print speed of the printing apparatus 110, the printer driver 108 calculates the print processing time based on the average print processing time required to print one page of the print format data, the complexity of the print format data, the processing abilities of the printing apparatus 110, the print settings, and the total print page number.

A print start time notification user interface 1202 shown in FIG. 12C can be used to notify a user of the calculation result, to let a user know the information relating to the print start time, the print end time, and the time limit for changing the print settings.

The scheduled print management program 105 displays a print start notification user interface 1203 shown in FIG. 12D on the display unit 14 of the computer 100 immediately before the print start time, to let a user finally confirm the start of the print processing. For example, if additional time is required to change the application data 109, a user can input a desirable extension time on the print start notification user interface 1203.

The print processing starts automatically if no operation is made by the user within a predetermined period of time after starting the display of the print start notification user interface 1203.

FIG. 13 shows one example of the essential arrangement of the computer 100 that can create a schedule table storing print schedules and backup data. The application program 107 can create the application data 109 in the HD drive 13 of the computer 100 based on a user's operation on the operating section 18.

When the scheduled print designation user interface 1201 is displayed on the display unit 14 of the computer 100, a user can input required data or select desirable items through the operating section 18 to perform the above-described designation.

More specifically, a user can designate target application data and desirable print start time (or print end time), or can select print start or print end, or can determine whether the print format data 1302 will be deleted after accomplishing the print processing. The information designated using the scheduled print designation user interface 1201 is transmitted to the scheduled print management program 105.

The scheduled print management program 105 can determine whether the application data 109 designated using the scheduled print designation user interface 1201 is stored in the HD drive 13 of the computer 100.

When the application data 109 is stored, the scheduled print management program 105 decides that the information designated using the scheduled print designation user interface 1201 is valid. Then, the scheduled print management program 105 writes, into a schedule table 1303, the name and storage destination of the application data 109, the print start time (or print end time), and the decision with respect to deletion of print format data 1302 after accomplishing the print processing.

Additionally, the scheduled print management program 105 performs replication (copy) processing of the application data 109 and creates backup data 1301 in the HD drive 13 of the computer 100. Then, the scheduled print management program 105 writes, into the schedule table 1303, the name and storage destination of the backup data 1301.

Subsequently, the scheduled print management program 105 instructs the printer driver 108 to convert the application data 109 into the print format data 1302 and store the print format data 1302 into a predetermined HD drive. The printer driver 108 converts the application data 109 into the print format data 1302, and stores the print format data 1302 into a predetermined HD drive.

Furthermore, the printer driver 108 calculates the time required for converting the application data 109 into the print format data 1302. Additionally, the printer driver 108 calculates the print processing time based on complexity of the converted data, processing abilities of the printing apparatus 110, and print settings (especially the number of copies).

The printer driver 108 notifies the scheduled print management program 105 of the storage destination of the print format data 1302 and the print processing time. The scheduled print management program 105 writes the storage destination of the print format data 1302 into the schedule table 1303. Furthermore, the scheduled print management program 105 calculates the print processing start time based on the print processing time, and writes the calculated print processing start time into the schedule table 1303.

For example, when the print end time is designated by a user, the scheduled print management program 105 can calculate the print processing start time by subtracting a print processing time from the designated print end time, and can write the calculated print processing start time into the schedule table 1303.

Next, exemplary operations of the image forming system performed according to the present exemplary embodiment will be described with reference to the flowcharts of FIGS. 14 through 17.

Figure 14:
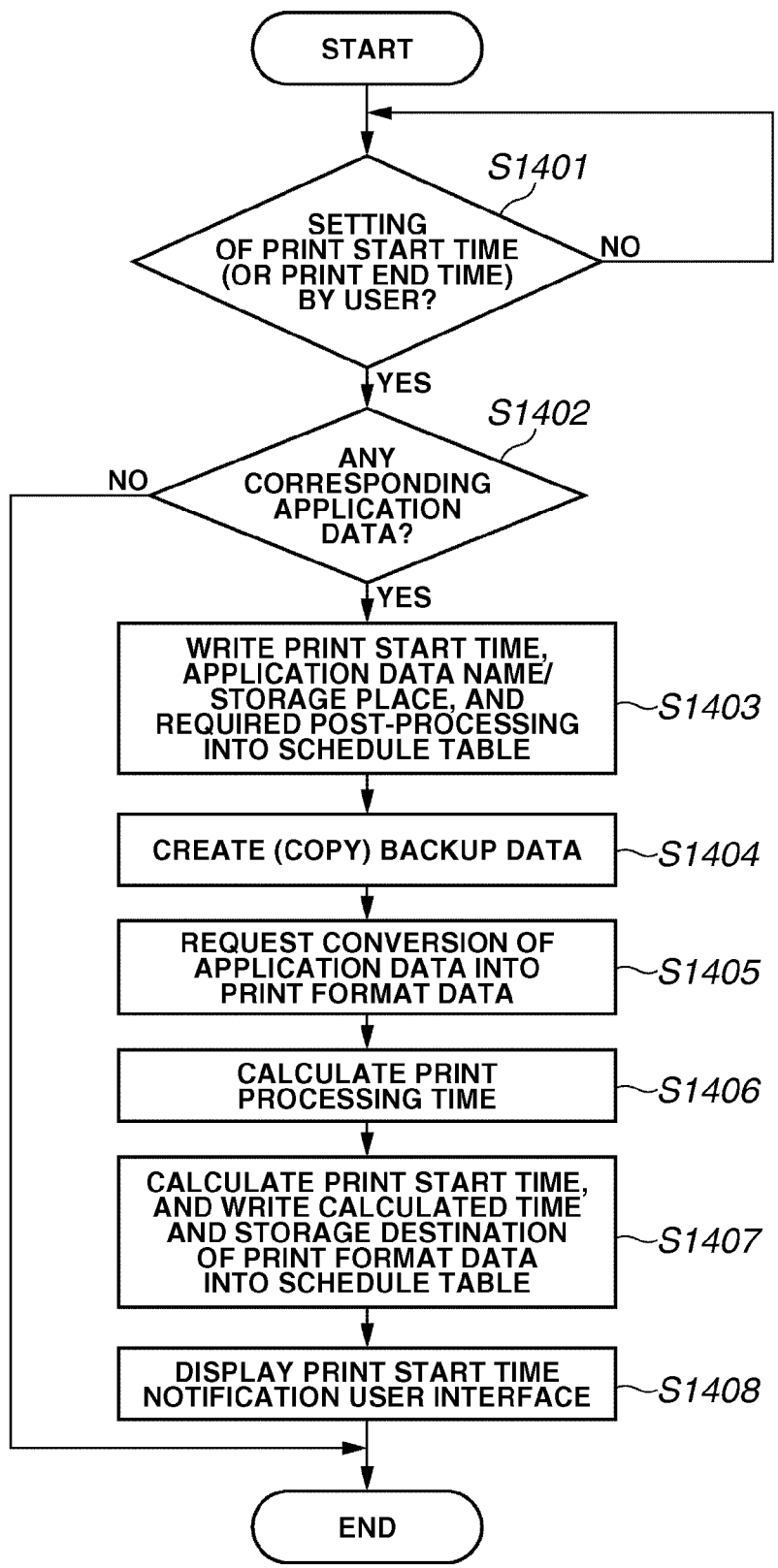
FIG. 14 is a flowchart showing exemplary processing of a scheduled print management program performed, when a user sets a print start time (or print end time) of application data, in accordance with the second exemplary embodiment.

FIG. 14 is a flowchart showing exemplary processing of the scheduled print management program 105 performed when a user sets desired print start time (or print end time) of the application data 109 using the scheduled print designation user interface 1201.

The scheduled print management program 105 determines whether a user has set the print start time (or print end time) of the application data 109 using the scheduled print designation user interface 1201 (refer to step S1401). More specifically, the scheduled print management program 105 determines whether the print start time (or print end time) designated by a user has been received.

When the print start time (or print end time) of the application data 109 has been set (i.e., YES in step S1401), the processing flow proceeds to step S1402. Then, the scheduled print management program 105 determines whether the application data 109 having the designated print start time (or print end time) is present in the HD drive 13 of the computer 100 (refer to step S1402).

When the application data 109 having the designated print start time (or print end time) is not present (i.e., NO in step S1402), the scheduled print management program 105 terminates the processing of this routine.

On the other hand, when the application data 109 having the designated print start time (or print end time) is present (i.e., YES in step S1402), the processing flow proceeds to step S1403. Then, the scheduled print management program 105 writes, into the schedule table 1303, the name and storage place of the application data 109, print start time (or print end time), and decision with respect to deletion of the print format data 1302 after accomplishing the print processing (refer to step S1403)

Next, the scheduled print management program 105 creates the backup data 1301 in the HD drive 13 of the computer 100 (refer to step S1404). Next, the scheduled print management program 105 instructs the printer driver 108 to convert the application data 109 into the print format data 1302 (refer to step S1405).

The printer driver 108 calculates the time required for the conversion of the application data 109 into the print format data 1302 and the print processing time. Then, the printer driver 108 returns, to the scheduled print management program 105, the calculated results and a storage destination of the data having the print format corresponding to the printing apparatus 110(refer to step S1406).

Next, the scheduled print management program 105 calculates the print processing start time based on the print processing time, and writes the calculation result and a storage destination of the print format data 1302 into the schedule table 1303 (refer to step S1407). Next, the scheduled print management program 105 displays the print start time notification user interface 1202 on the display unit 14 of the computer 100 (refer to step S1408).

Figure 15:
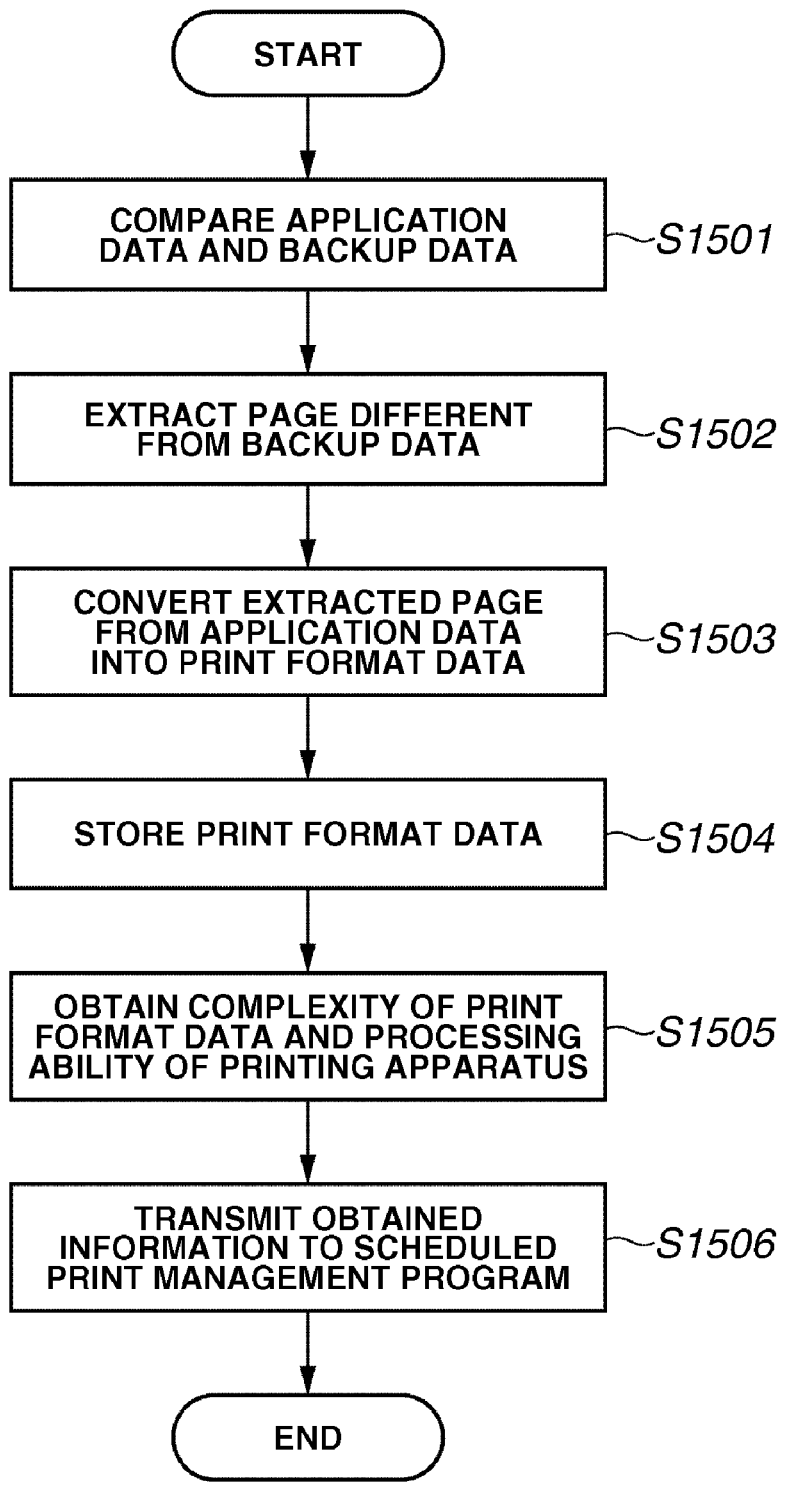
FIG. 15 is a flowchart showing exemplary processing of a printer driver performed, when the scheduled print management program requests conversion of application data into print format data, in accordance with the second exemplary embodiment.

FIG. 15 is a flowchart showing exemplary processing of the printer driver 108 performed when the scheduled print management program 105 requests conversion of the application data 109 into the print format data 1302.

The printer driver 108 compares the application data 109 of a conversion object to the backup data 1301 (refer to step S1501). The processing of step S1501 can be omitted when the application data 109 is first converted.

Next, the printer driver 108 extracts a page (or pages) of the application data 109 different from the contents of the backup data 1301 (refer to step S1502). When the application data 109 is first converted, the printer driver 108 decides that all pages are changed and extracts all pages in step S1502.

Next, the printer driver 108 converts the extracted page(s) into the print format data 1302 (refer to step S1503). Next, the printer driver 108 stores the print format data 1302 into a predetermined HD drive (refer to step S1504).

Next, the printer driver 108 checks (obtains) the complexity of converted data and the processing abilities of printing apparatus 110 (refer to step S1505). The printer driver 108 can calculate the complexity of the converted data based on the object type (e.g., character, graphic, or image) involved in print format data 1302, the size of each object, and the drawing processing method.

Furthermore, the printer driver 108 can calculate the processing abilities of the printing apparatus 110 based on the performance of the CPU 23 (clock, cache size, etc) and the presence of a dedicated accelerator (e.g., expansion H/W of compression data). Then, the printer driver 108 transmits a storage destination of the print format data 1302, the calculated complexity, and the processing abilities of the printing apparatus 110 to the scheduled print management program 105 (refer to step S1506).

Figure 16:
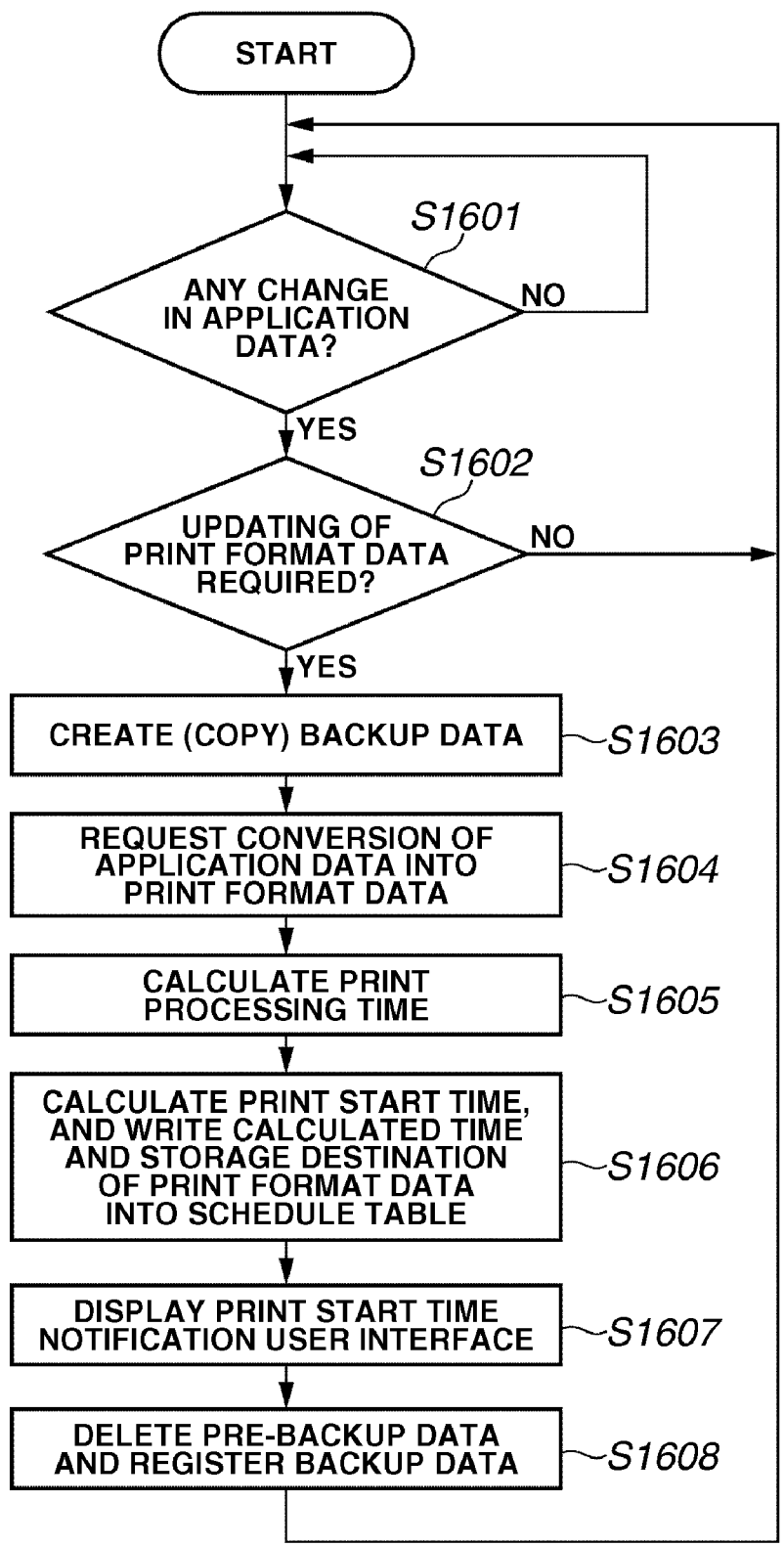
FIG. 16 is a flowchart showing exemplary processing of the scheduled print management program performed, when update of the print format data is instructed, in accordance with the second exemplary embodiment.

FIG. 16 is a flowchart showing exemplary processing of the scheduled print management program 105 performed when update of the print format data 1302 is instructed. The processing routine of FIG. 16 starts upon creating the print format data 1302 and is repeated until the print processing actually starts.

First, the scheduled print management program 105 determines whether the application data 109 is changed (refer to step S1601). For example, the scheduled print management program 105 can detect any change in the size of the application data 109 or in the saved date/time.

When there is any change in the application data 109 (i.e., YES in step S1601), the scheduled print management program 105 determines the necessity of updating the print format data 1302 with reference to the contents of the schedule table 1303 (refer to step S1602). When the update of print format data 1302 is unnecessary (i.e., NO in step S1602), the processing flow returns to step S1601.

On the other hand, when the update of print format data 1302 is necessary (i.e., YES in step S1602), the scheduled print management program 105 replicates (copies) the application data 109 to create the backup data 1301 (refer to step S1603). Namely, a copy of the application data is produced, while the backup data 1301 previously created is not erased. In the context of the present exemplary embodiment, the backup data 1301 previously created is referred to as "pre-backup data 1301."

Next, the scheduled print management program 105 instructs the printer driver 108 to convert the application data 109 into print format data processible in the printing apparatus 110 (refer to step S1604). For example, the printer driver 108 can obtain differences between the application data 109 and the pre-backup data 1301 and can produce the print format data 1302 on a page-by-page basis.

The printer driver 108 calculates the time required for the conversion of the application data 109 into the print format data 1302 and the print processing time. Then, the printer driver 108 returns, to the scheduled print management program 105, the calculated result and a storage destination of the print format data 1302 (refer to step S1605).

Next, the scheduled print management program 105 calculates the print start time (or print end time) based on the print processing time, and writes the calculated result and a storage destination of the print format data 1302 into the schedule table 1303 (refer to step S1606).

Subsequently, the scheduled print management program 105 displays the print start time notification user interface 1202 on the display unit 14 of the computer 100 (refer to step S1607). Then, the scheduled print management program 105 deletes the pre-backup data 1301 and writes the backup data 1301 created in step S1603 into the schedule table 1303 (refer to step S1608).

Figure 17:
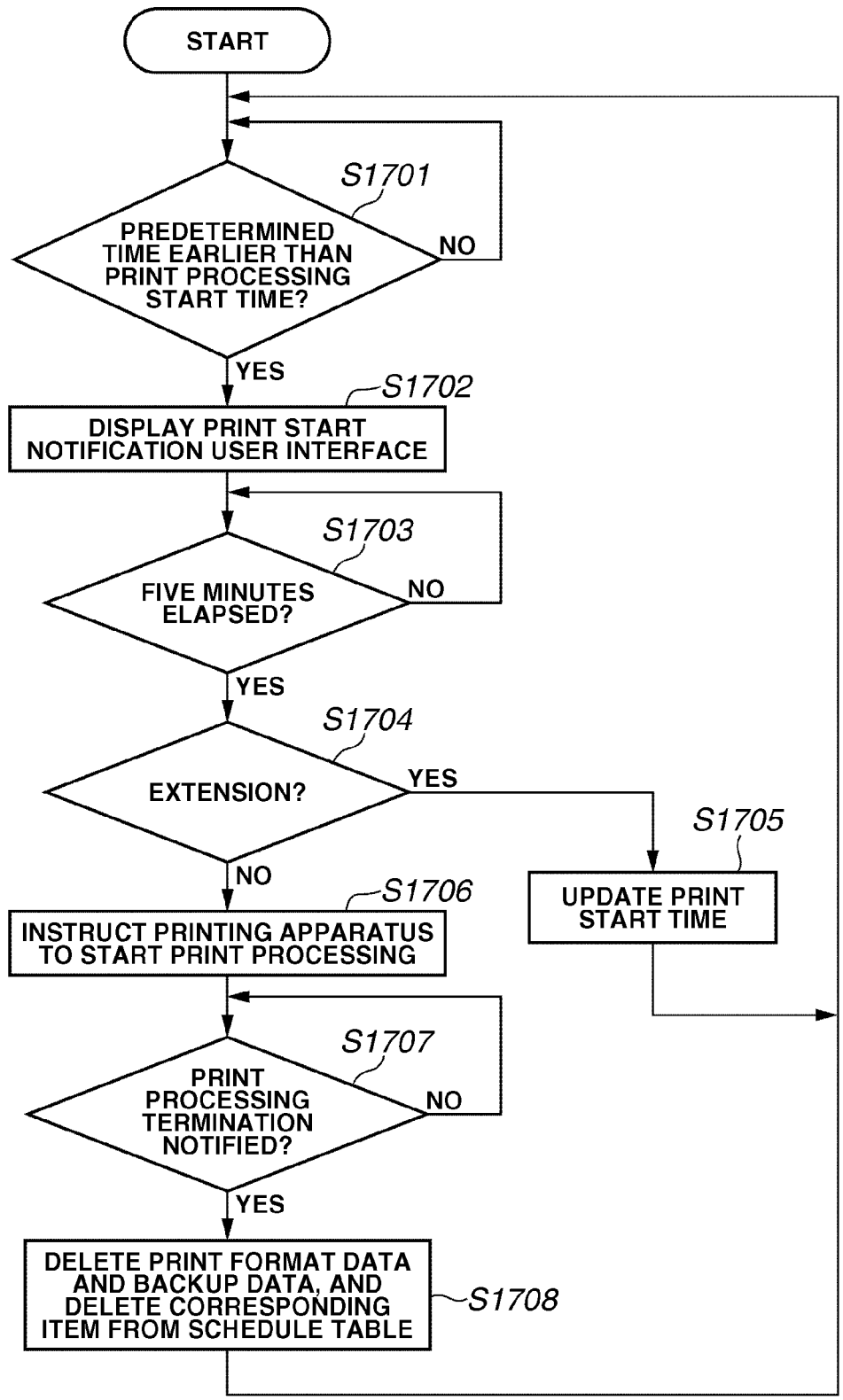
FIG. 17 is a flowchart showing exemplary processing of the scheduled print management program performed, when the printing apparatus is instructed to start the print processing at print processing start time, in accordance with the second exemplary embodiment.

FIG. 17 is a flowchart showing exemplary processing performed based on the scheduled print management program 105 when the printing apparatus 110 is instructed to start the print processing at the print processing start time. The processing routine of FIG. 17 is constantly performed when the print start time (or print end time) of the application data 109 is designated by a user.

The scheduled print management program 105 compares the print processing start time of the schedule table 1303 to the present time, and determines whether the present time is a predetermined time earlier than the print processing start time (refer to step S1701).

When the present time is the predetermined time earlier than the print processing start time (i.e., YES in step 1701), the scheduled print management program 105 displays the print start notification user interface 1203 on the display unit 14 of the computer 100 (refer to step S1702) to notify a user of starting the print processing.

Next, the scheduled print management program 105 determines whether a predetermined amount of time, e.g., five minutes, has elapsed after starting the display of the print start notification user interface 1203 on the display unit 14 of the computer 100 (refer to step S1703). When the predetermined amount of time has elapsed after starting the display of the print start notification user interface 1203 (i.e., YES in step S1703), the processing flow proceeds to step S1704.

Then, the scheduled print management program 105 determines whether any extension time is input by a user using the print start notification user interface 1203 (refer to step S1704). Namely, the scheduled print management program 105 determines whether a user has requested extension of the print start time.

When the extension of the print start time is requested (i.e., YES in step S1704), the processing flow proceeds to step S1705. Then, the scheduled print management program 105 extends (updates) the print processing start time stored in the schedule table 1303 according to the extension time designated on the print start notification user interface 1203 (refer to step S1705). Then, the processing flow returns to step S1701.

On the other hand, when the extension of the print start time is not requested (i.e., NO in step S1704), the scheduled print management program 105 instructs the printing apparatus 110 to start the print processing (refer to step S1706). Then, the scheduled print management program 105 determines whether the printing apparatus 110 has accomplished the print processing (refer to step S1707).

When the termination of the print processing is notified from the printing apparatus 110 (i.e., YES in step S1707), the scheduled print management program 105 deletes the print format data 1302 and the backup data 1301. Additionally, the scheduled print management program 105 deletes the description relating to the printed application data 109 from the schedule table 1303 (refer to step S1708).

The scheduled print management program 105 can delete the print format data 1302 according to the user's settings. The scheduled print management program 105 can transfer the print format data 1302 to another management module so that the print format data 1302 can be reused.

In addition, the scheduled print management program 105 can hold a management table (not shown) so that the print format data 1302 can be stored in the management table. In this case, the print format data 1302 stored in the management table can be reused later if the print start time (or print end time) of the application data 109 is newly set.

As described above, the present exemplary embodiment converts the application data 109, if its print start time (or print end time) is designated by a user, into the data having the print format corresponding to the printing apparatus 110 (print format data 1302) before starting the print processing. Then, the present exemplary embodiment stores the converted print format data 1302 into the printing apparatus 110 before starting the print processing.

Then, the present exemplary embodiment starts monitoring the application data 109 and continues the monitoring processing until the print processing actually starts. When the application data 109 is updated, the present exemplary embodiment compares the changed application data 109 to the previous application data 109 and converts only the different portion(s) into the print format data 1302 on a page-by-page basis.

Accordingly, when the printing of the application data 109 is designated by a user, the application data 109 can be speedily converted into the data having the print format corresponding to the printing apparatus 110 (i.e., print format data 1302) at the timing earlier than the print start time designated by the user.

If the application data 109 is changed before the print start time designated by a user, the present exemplary embodiment can produce the print format data 1302 reflecting the changes. Accordingly, the present exemplary embodiment can appropriately execute the processing for converting the application data 109 into the print format data 1302 and can promptly start the print processing. Therefore, the present exemplary embodiment can reduce the time required for accomplishing the print processing of a print product.

Furthermore, the present exemplary embodiment can create the backup data 1301 of the application data 109 and compare the backup data 1301 to the application data 109 on a page-by-page basis. Then, the present exemplary embodiment can convert only the limited page(s) of the application data 109 different from those of the backup data 1301 into the print format data 1302.

Furthermore, when the application data 109 is updated, the present exemplary embodiment can convert difference data between the application data 109 and the pre-backup data 1301 into the print format data 1302. Accordingly, the application data 109 can be speedily converted into the print format data 1302.

According to the above-described first exemplary embodiment, the print processing does not start without user's print instruction and the application data 104 stored in the folder 201 is fully converted when the print processing is executed. If any data not required to print is included, the conversion processing of the application data 104 will be uselessly executed.

Additionally, when the application data 104 is updated, the above-described first exemplary embodiment obtains differences between the application data 104 and the PDL data (i.e., the data having the print format corresponding to the printing apparatus 110) for each object, and produces PDL data for an object not yet produced. When numerous objects are included in the application data 104, it takes a long processing time to create PDL data for each object and update the PDL data.

On the other hand, the present exemplary embodiment can convert the application data 109, if designated to print by a user, into the data having the print format corresponding to the printing apparatus 110 (print format data 1302) at the timing earlier than the print start time designated by a user.

Additionally, the present exemplary embodiment can convert only the limited page (s) different from the backup data 1301, or only the data different from the pre-backup data 1301, into the print format data 1302.

In the present exemplary embodiment, the schedule management program 105 operates on the computer 100. However, the schedule management program 105 can also operate on the printing apparatus 110. Even in this case, when the application data 109 is stored in the HD drive 13 of the computer 100, the printing apparatus 110 has a function of mounting the HD drive 13 of the computer 100.

Figure 18:
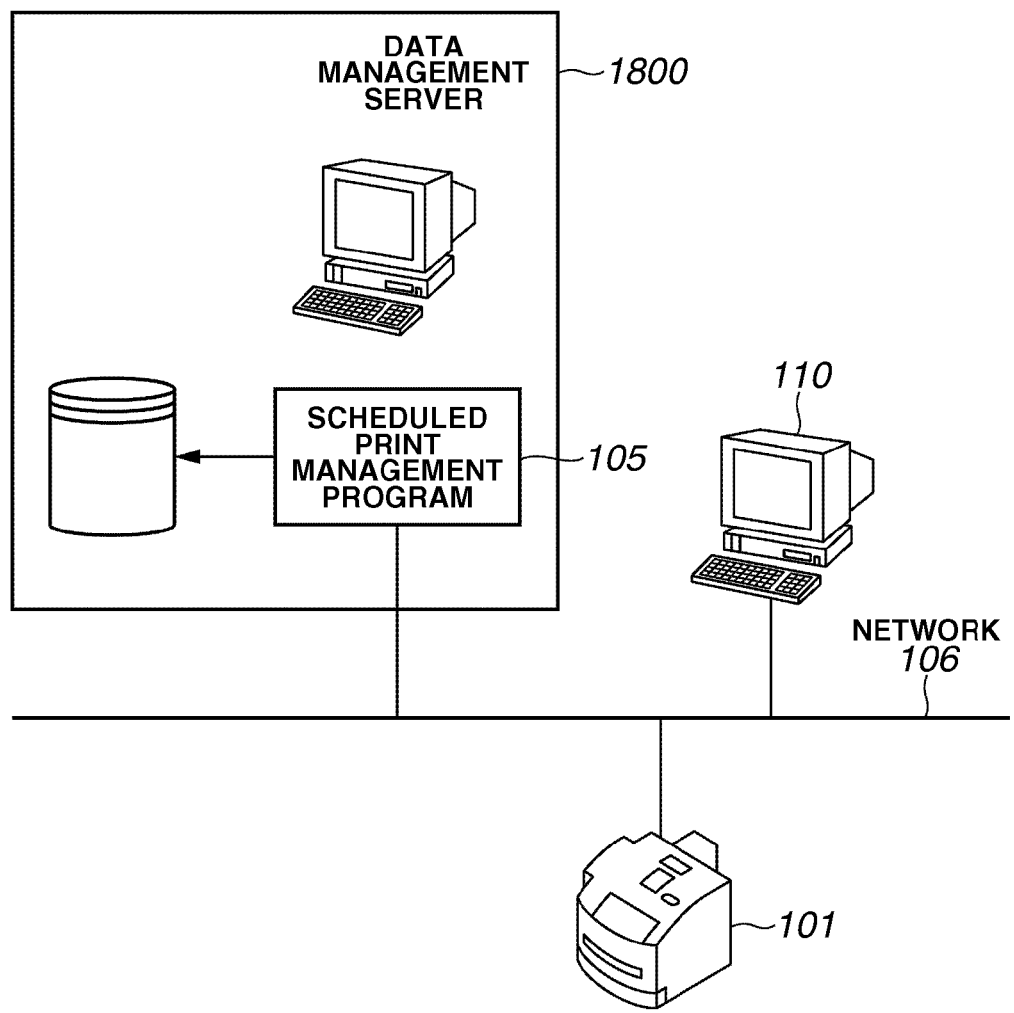
FIG. 18 is a diagram illustrating other arrangement of the image forming system in accordance with the second exemplary embodiment.

Furthermore, in the present exemplary embodiment, the application data 109 is processed on the computer 100 of each user. However, it is possible to store the application data 109 in a data management server 1800 shown in FIG. 18. In this case, the schedule management program 105 can be provided in the data management server 1800.

Furthermore, in the present exemplary embodiment, immediately after a user designates the print start time (or print end time) of the application data 109 on the scheduled print designation user interface 1201, the scheduled print management program 105 instructs the conversion of the application data 109 into the print format data 1302. However, the scheduled print management program 105 can instruct the conversion of the application data 109 into the print format data 1302 at any appropriate timing other than the print start time (or print end time) of the application data 109.

For example, when the processing load of the computer 100 or the printing apparatus 110 is small, the scheduled print management program 105 can instruct the conversion of the application data 109 into the print format data 1302.

More specifically, immediately after a user sets the print start time (or print end time), the user is still operating on the computer 100 and accordingly the computer 100 has a heavy processing load. Therefore, it is preferable to avoid instructing the conversion of the application data 109 into the print format data 1302 at this timing.

Furthermore, the printing apparatus 110 has a heavy processing load during the print operation. Thus, it is preferable to avoid instructing the conversion of the application data 109 into the print format data 1302 when the print processing is actually executed.

Furthermore, print schedules of plural application data 109 may overlap with each other. To solve the problem, it may be possible to prohibit the overlap of schedules beforehand. It is also possible to cancel the print schedule of the application data 109 set later. When the print end time is designated, printing of the application data 109 can be accomplished earlier than the print end time.

However, for the purpose of enhancing the security, a user may strictly request finishing the print processing just on the designated print end time. In such a case, as shown in FIG. 19, a schedule table 1901 enabling a user to set a security level can be used. For example, when the security level is high, the print processing is strictly controlled so as to accurately finish at the designated print end time. When the security level is low, finishing the print processing earlier than the designated print end time is allowed.

According to the example shown in FIG. 19, print schedules 1902 and 1903 have the same print end time. In the case, the print schedule 1902 having a lower security level accomplishes earlier (or later) than the designated print end time, while the print schedule 1903 having a higher security level accurately terminates at the designated print end time.

In the present exemplary embodiment, the printer driver 108 calculates the print processing time. However, the scheduled print management program 105 can calculate the print processing time. In this case, the printer driver 108 can transmit, to the scheduled print management program 105, the information required to calculate the print processing time and the storage destination of the print format data 1302, when the conversion processing of the application data 109 is terminated.

Furthermore, when the application data 109 is changed, the present exemplary embodiment can convert the difference between the changed application data 109 and the pre-backup data 1301 into the print format data 1302. However, it is not always necessary to convert the difference between the application data 109 and the pre-backup data 1301 into the print format data 1302. It is possible to convert the entire application data 109 into the print format data 1302.

Furthermore, similar to the first exemplary embodiment, the application data 109 can be stored into a folder (i.e., specific region) of the HD drive 13 provided in the computer 100. Then, the application data 109 can be converted into the print format data 1302. The produced print format data 1302 can be stored in a storage region corresponding to the folder in the HD drive 25 of the printing apparatus 110.

Other Exemplary Embodiments

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses the means for supplying the program code to a computer, such as a storage (or recording) medium storing the program code. In this case, the type of program can be any one of object code, interpreter program, and OS script data. A recording medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Furthermore, an operating system (OS) or other application software running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

According to the above-described exemplary embodiments of the present invention, when the application data is created (stored) in a specific region of the information processing apparatus, print data processible in the printing apparatus (e.g., PDL data) can be produced based on the application data at the timing not related to the print instruction supplied to the printing apparatus.

Accordingly, it is possible to prepare beforehand the print data (e.g., PDL data) used in the print processing performed in the printing apparatus. Performing the print processing based on the prepared print data (e.g., PDL data) can reduce the time required for accomplishing the print processing.

Furthermore, according to other characteristic features of the exemplary embodiments of the present invention, print data processible in the image forming apparatus (e.g., PDL data) can be produced based on application data having the designated print start time or print end time, before starting the print processing.

Therefore, the print data (e.g., PDL data) used when the printing apparatus performs the print processing can be prepared at earlier timing. Thus, the print processing can be surely started based on the prepared print data (e.g., PDL data) at the print start time. Thus, the processing for producing the print data printable in the image forming apparatus can be executed appropriately and the print processing can be surely started. Thus, the time required for accomplishing the print processing can be reduced.

Furthermore, according to other characteristic features of the exemplary embodiments of the present invention, when the application data is updated before starting the print processing, the print data reflecting the updated contents can be produced. Thus, even if the application data is changed before starting the print processing, the processing for producing the print data processible in the image forming apparatus can be appropriately executed and the print processing can be surely started.

Furthermore, according to other characteristic features of the exemplary embodiments of the present invention, the application data can be replicated (copied) and the replicated (copied) application data can be compared to updated application data on a page-by-page basis. Then, the print data corresponding to the page(s) different from the replicated (copied) application data can be produced based on the updated application data. Thus, it is unnecessary to convert the entire application data into print data, and accordingly the print data can be speedily produced.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2005-310474 filed Oct. 25, 2005 and 2006-141682 filed May 22, 2006, which are hereby incorporated by reference herein in their entirety.

What is claimed is:

1. An information processing apparatus having a processor, the apparatus comprising:
a printer driver unit configured to produce page description language (PDL) data based on application data, to transmit the produced PDL data to a printing apparatus and to store correlation information correlating information identifying the application data with information identifying the PDL data, when the application data is produced in a specific region;
a first determination unit configured to determine, using the processor, whether application data corresponding to a print instruction is the application data stored in the specific region, when printing is instructed;
a second determination unit configured to determine, using the processor, whether the PDL data corresponding to the application data is stored in the printing apparatus, when the first determination unit determines that the application data corresponding to the print instruction is the application data stored in the specific region; an output unit configured to produce PDL data based on application data and to output the produced PDL data to the printing apparatus, when the first determination unit determines that the application data corresponding to the print instruction from an application is not the application data stored in the specific region; and
a notification unit configured to notify the printing apparatus of print setting information including the information identifying the PDL data stored in the printing apparatus and a command to print the PDL data stored in the printing apparatus, when the second determination unit determines that the PDL data corresponding to the application data is stored in the printing apparatus.

2. The information processing apparatus according to claim 1, further comprising:
a registration unit configured to convert the application data into PDL data and to register a print processing start time and a storage destination of the converted PDL data in a schedule table, when the print processing start time is set; and an instruction unit configured to instruct the printing apparatus to start print processing when a present time is a predetermined time earlier than the print processing start time.

3. An image forming method comprising:
producing page description language (PDL) data based on application data;
transmitting the produced PDL data to a printing apparatus;
storing correlation information correlating information identifying the application data with information identifying the PDL data, when the application data is produced in a specific region;
determining whether application data corresponding to a print instruction is the application data stored in the specific region, when printing is instructed;
determining whether the PDL data corresponding to the application data is stored in the printing apparatus, when the application data corresponding to the print instruction is determined to be the application data stored in the specific region;
producing PDL data based on application data;
outputting the produced PDL data to the printing apparatus, when a determination is made that the application data is corresponding to the print instruction from an application is not the application data stored in the specific region; and
notifying the printing apparatus of print setting information including the information identifying the PDL data stored in the printing apparatus and a command to print the PDL data stored in the printing apparatus, when a determination is made that the PDL data corresponding to the application data is stored in the printing apparatus.

4. The image forming method according to claim 3, further comprising:
converting the application data into PDL data;
registering a print processing start time and a storage destination of the converted PDL data in a schedule table, when the print processing start time is set; and
instructing the printing apparatus to start print processing when a present time is a predetermined time earlier than the print processing start time.

5. A non-transitory computer-readable medium having stored thereon a computer program for causing a computer to execute an image forming method comprising:
producing page description language (PDL) data based on application data;
transmitting the produced PDL data to a printing apparatus;
storing correlation information correlating information identifying the application data with information identifying the PDL data, when the application data is produced in a specific region;
determining whether application data corresponding to a print instruction is the application data stored in the specific region, when printing is instructed;
determining whether the PDL data corresponding to the application data is stored in the printing apparatus, when the first determining determines that the application data corresponding to the print instruction is the application data stored in the specific region;
producing PDL data based on application data;
outputting the produced PDL data to the printing apparatus, when a determination is made that the application data is corresponding to the print instruction from an application is not the application data stored in the specific region; and
notifying the printing apparatus of print setting information including the information identifying the PDL data stored in the printing apparatus and a command to print the PDL data stored in the printing apparatus, when a determination is made that the PDL data corresponding to the application data is stored in the printing apparatus.

6. The computer-readable medium according to claim 5, wherein the image forming method further comprises:
converting the application data into PDL data;
registering a print processing start time and a storage destination of the converted PDL data in a schedule table, when the print processing start time is set; and
instructing the printing apparatus to start print processing when a present time is a predetermined time earlier than the print processing start time.

* * * * *